US009450476B2

(12) United States Patent
Ito et al.

(10) Patent No.: US 9,450,476 B2
(45) Date of Patent: Sep. 20, 2016

(54) ELECTRIC DRIVE UNIT

(75) Inventors: Shinichi Ito, Chiyoda-ku (JP); Haruki Umazume, Minato-ku (JP); Akihiro Yamamura, Chiyoda-ku (JP); Shinsuke Hemmi, Chiyoda-ku (JP); Masayasu Miyajima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 391 days.

(21) Appl. No.: 14/122,788

(22) PCT Filed: Nov. 4, 2011

(86) PCT No.: PCT/JP2011/075417
§ 371 (c)(1),
(2), (4) Date: Nov. 27, 2013

(87) PCT Pub. No.: WO2013/038572
PCT Pub. Date: Mar. 21, 2013

(65) Prior Publication Data
US 2014/0091683 A1    Apr. 3, 2014

(30) Foreign Application Priority Data
Sep. 12, 2011    (JP) ................... 2011-198462

(51) Int. Cl.
*H02K 11/00*    (2016.01)
*B62D 5/04*    (2006.01)
(Continued)

(52) U.S. Cl.
CPC ......... *H02K 11/0073* (2013.01); *B62D 5/0406* (2013.01); *H02K 11/225* (2016.01); *H02K 11/38* (2016.01); *H01R 13/112* (2013.01); *H02K 3/522* (2013.01); *H02K 5/225* (2013.01)

(58) Field of Classification Search
CPC .......... H01L 25/11; H02K 9/00; H02K 9/22; H02K 11/33; H02K 11/38; H02K 15/14; H02K 29/08
See application file for complete search history.

(56) References Cited

U.S. PATENT DOCUMENTS 3,809,935 A * 5/1974 Kristen .................. H02K 11/33
                                                310/68 R
4,926,075 A * 5/1990 Fushiya ................. H01R 39/36
                                                29/596

(Continued)

FOREIGN PATENT DOCUMENTS

EP         1955927 A1    8/2008
JP      2002-252958 A    9/2002

(Continued)

OTHER PUBLICATIONS

Communication dated Sep. 10, 2015 from the European Patent Office in counterpart European Application No. 11872253.7.

(Continued)

*Primary Examiner* — Tran Nguyen
(74) *Attorney, Agent, or Firm* — Sughrue Mion, PLLC

(57) ABSTRACT

An electric drive unit (100) of the invention includes the electric motor (1) and the control apparatus (20) that is disposed on an axis line of a rotation shaft (2) of the electric motor (1) and controls the driving of the electric motor (1). The electric motor (1) has a motor terminal (13) extending parallel to an axial direction of the rotation shaft (2) toward the control apparatus (20) and a slit (13a) is provided to the motor terminal (13) at an end on a side of the control apparatus (20). The control apparatus (20) has a motor connection terminal (34) provided on a line extended from the motor terminal (13) and connected to the motor terminal (13). The slit (13a) in the motor terminal (13) is press-fit and fixed to the motor connection terminal (34).

17 Claims, 15 Drawing Sheets

(51) Int. Cl.
  *H02K 3/52* (2006.01)
  *H02K 5/22* (2006.01)
  *H01R 13/11* (2006.01)

(56) References Cited

U.S. PATENT DOCUMENTS

| | | | |
|---|---|---|---|
| 5,218,255 A | 6/1993 | Horiguchi | |
| 5,825,107 A * | 10/1998 | Johnson | H02K 11/33 310/64 |
| 5,939,807 A * | 8/1999 | Patyk | H02K 5/161 310/64 |
| 6,268,669 B1 * | 7/2001 | Wakao | B62D 5/0406 180/443 |
| 8,310,119 B2 * | 11/2012 | Uryu | H02K 11/024 310/68 B |
| 2002/0060105 A1 * | 5/2002 | Tominaga | B62D 5/0406 180/443 |
| 2002/0117914 A1 | 8/2002 | Doi et al. | |
| 2003/0127921 A1 | 7/2003 | Akutsu et al. | |
| 2007/0063596 A1 * | 3/2007 | Akutsu | H02K 11/21 310/68 B |
| 2007/0278873 A1 | 12/2007 | Macaire | |
| 2009/0250287 A1 | 10/2009 | Takashima et al. | |
| 2011/0031851 A1 * | 2/2011 | Uryu | H02K 11/024 310/68 B |
| 2012/0313467 A1 * | 12/2012 | Omae | B62D 5/0406 310/71 |

FOREIGN PATENT DOCUMENTS

| | | |
|---|---|---|
| JP | 2003-204654 A | 7/2003 |
| JP | 2009-278855 A | 11/2009 |
| JP | 2011-37324 A | 2/2011 |
| WO | 2011/065394 A1 | 6/2011 |

OTHER PUBLICATIONS

Communication dated Sep. 24, 2015 from the State Intellectual Property Office of the People's Republic of China in counterpart Application No. 201180073409.0.

* cited by examiner

ELECTRIC DRIVE UNIT

CROSS REFERENCE TO RELATED APPLICATIONS

This is a National Stage of International Application No. PCT/JP2011/075417 filed Nov. 4, 2011, claiming priority form Japanese Patent Application No. 2011-198462, filed Sep. 12, 2011, the contents of all of which are incorporated herein by reference in their entirety.

TECHNICAL FIELD

The present invention relates to an electric drive unit including an electric motor that outputs an assist torque to a steering wheel of a vehicle and a control apparatus that controls the driving of the electric motor, for example, an electric, drive unit employed in an electric power steering apparatus

BACKGROUND ART

There is an electric drive unit including an electric motor that outputs an assist torque to a steering wheel of a vehicle and a control apparatus that controls the driving of the electric motor and formed by attaching the control apparatus to the electric motor. Regarding an electric drive unit of this type, an electric power steering apparatus described, for example, in PLT 1 is proposed.

In the electric power steering apparatus described in PLT 1, a control unit serving as the control apparatus is disposed on an axis line of a rotation shaft of the electric motor and fixed to the electric motor. Herein, a power feeding portion of the electric motor and a joining part of the control unit are joined using screws inside a housing or a case through an opening provided to the housing or the case or the both.

CITATION LIST

Patent Literature

PLT 1: JP-A-2009-248754 (FIG. 2)

SUMMARY OF INVENTION

Technical Problem

The electric drive unit employed in the electric power steering apparatus described in PLT 1 requires screws to electrically connect the power feeding portion of the electric motor and the joining part of the control apparatus. Also, in order to join these portions using screws, an installation space for screws and an insertion space for a screw tightening tool are required. Consequently, the number of components and assembly man-hours are increased, which poses a problem that not only does the cost increase but a size of the unit also increases.

In addition, in this electric drive unit, the power feeding portion and the joining part are joined by tightening screws using a screw tightening tool from the opening. Hence, foreign matter (dust, water drop, and the like) from the outside may possibly come into a joining part, in which case an insulating property of the joining part cannot be ensured, or a water droplet may possibly adhere to the joining part and give rise to the formation of rust, in which case conductivity becomes poor. In order to ensure the insulating property and the waterproof property of the joining part, it is necessary to close the insertion opening for the screw tightening tool by additionally using a cover after the screws are tightened. This configuration, however, has a problem that the number of components and assembly man-hours are increased and the cost is increased further.

The invention was devised to solve the problems discussed above and has an object to provide an electric drive unit which is an electric drive unit including an electric motor and a control apparatus and formed by reducing the number of components and assembly man-hours.

Solution to Problem

An electric drive unit of the invention is an electric drive unit including an electric motor and a control apparatus that is disposed on an axis line of a rotation shaft of the electric motor and controls driving of the electric motor. The control apparatus includes a drive portion that drives the electric motor and is formed of semiconductor switching elements switching a current of the electric motor and passive elements electrically connected to the switching elements, and a frame in which a plurality of conductive plates to be connected to respective terminals of the passive elements are insert-molded with insulating resin and to which the passive elements are provided. One of the electric motor and the control apparatus has a first terminal extending parallel to an axial direction of the rotation shaft toward the other with a slit being provided to the first terminal at an end on a side of the other. The other has a second terminal provided on a line extended from the first terminal and electrically connected to the first terminal. The first terminal is fixed in a state of being press-fit to the second terminal by allowing the slit to sandwich the second terminal.

Advantageous Effects of Invention

According to the invention, it is possible to provide an electric drive unit which is an electric drive unit including an electric motor and a control apparatus and formed by reducing the number of components and assembly man-hours. In addition, the passive elements are provided to the frame with which the conductive plates are integrally molded and the terminals are individually connected to the conductive plates. It is therefore possible to provide an electric drive unit with enhanced assembly workability.

BRIEF DESCRIPTION OF DRAWINGS

FIG. 5 is a perspective view of a power module 21 of FIG. 1, wherein

FIG. 6 is a perspective view of a major portion of a frame 30 when the motor terminal 13 is in proximity to a guide portion 31 before the motor terminal 13 is fixed in a state of being press-fit to a motor connection terminal 34, wherein

FIG. 11 is a perspective view of a major portion of a housing 66 of FIG. 10, wherein

DESCRIPTION OF EMBODIMENTS

First Embodiment

Figure 1:
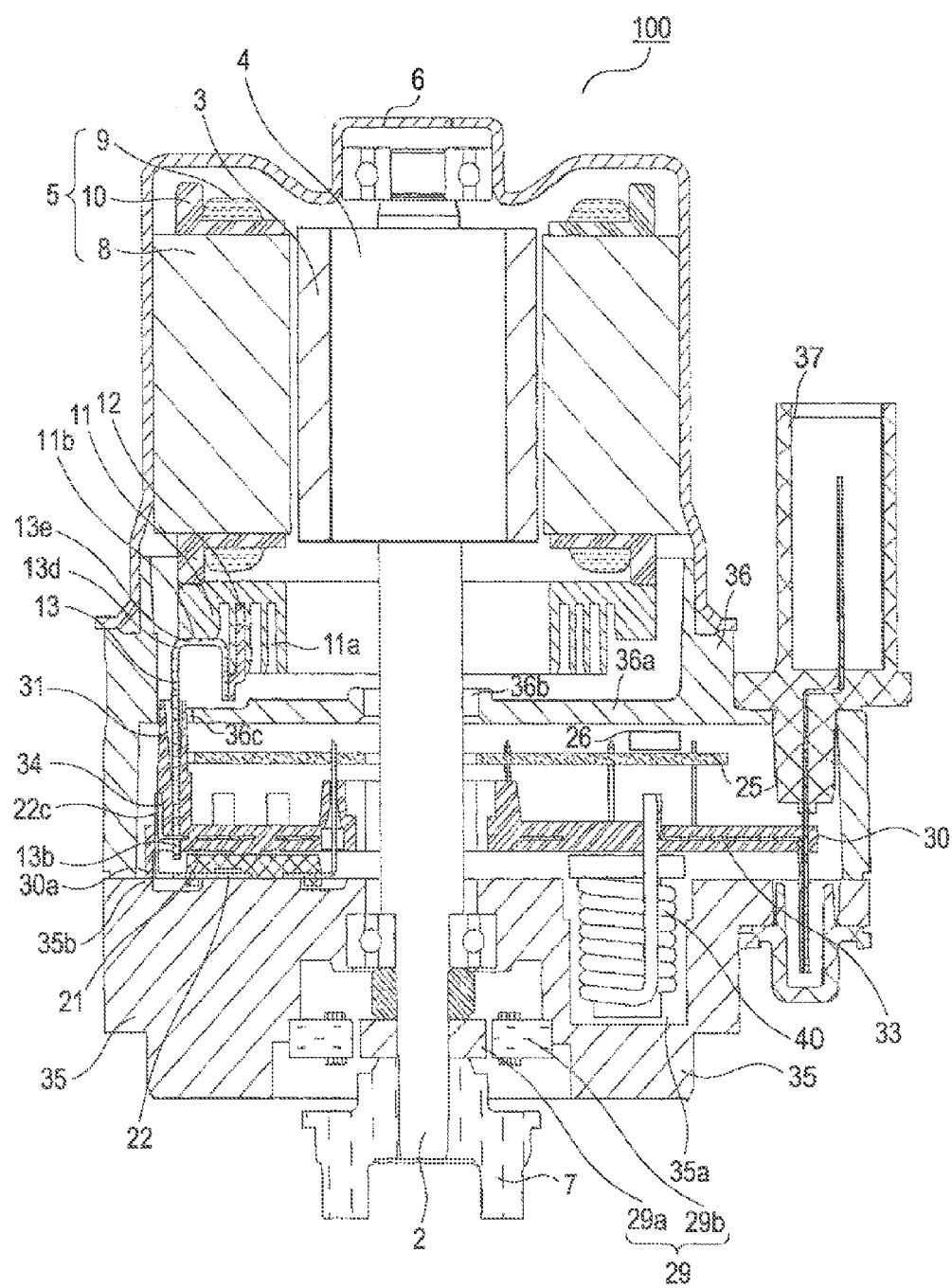
FIG. 1 is a cross section of an electric drive unit 100 according to a first embodiment of the invention.

Hereinafter, a first embodiment of the invention will be described according to FIG. 1 through FIG. 6. Descriptions will be given by labeling same or equivalent members and portions with same reference numerals.

Figure 2:
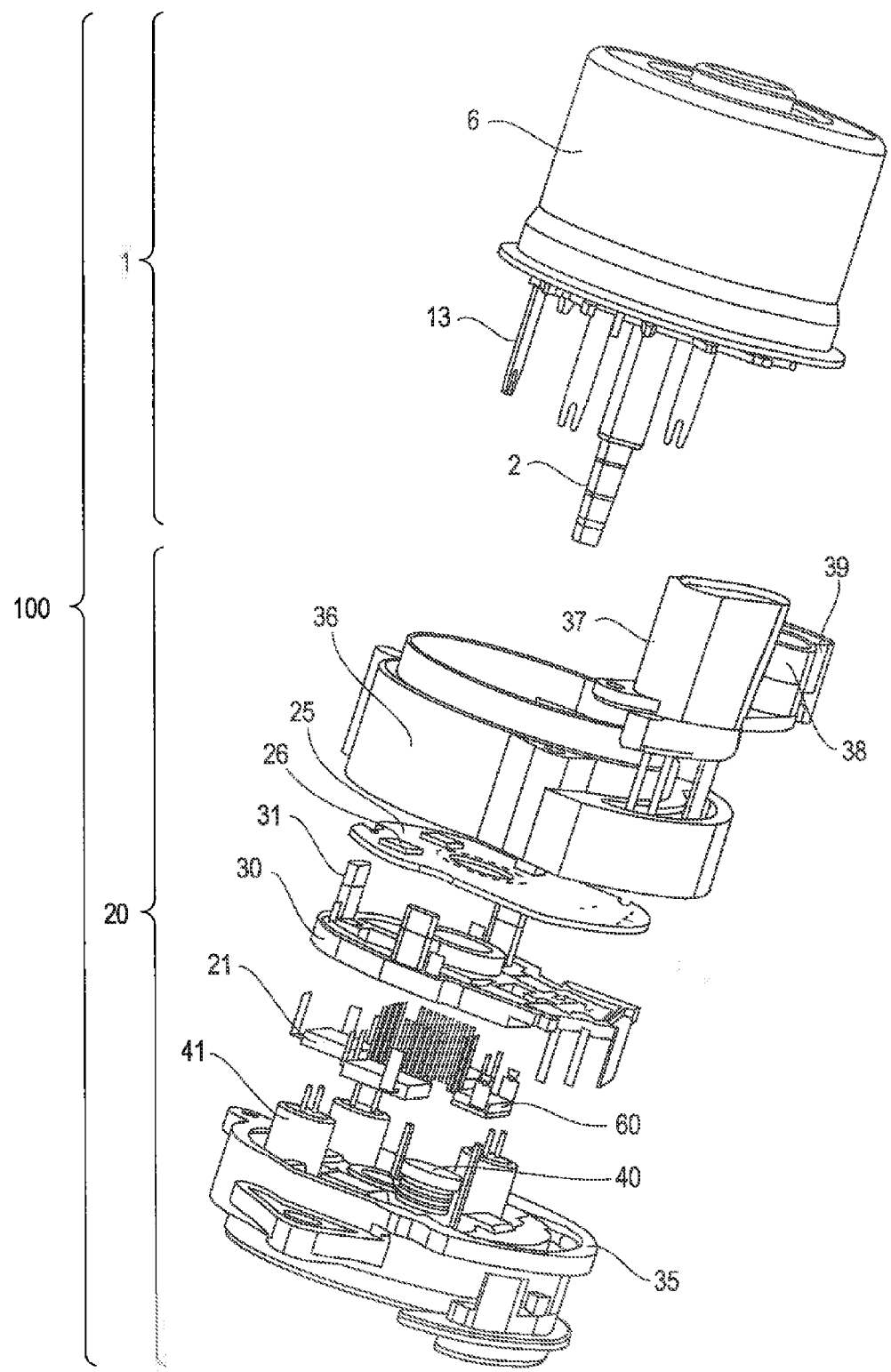
FIG. 2 is an exploded perspective view of the electric drive unit 100 according to the first embodiment of the invention.
Figure 3:
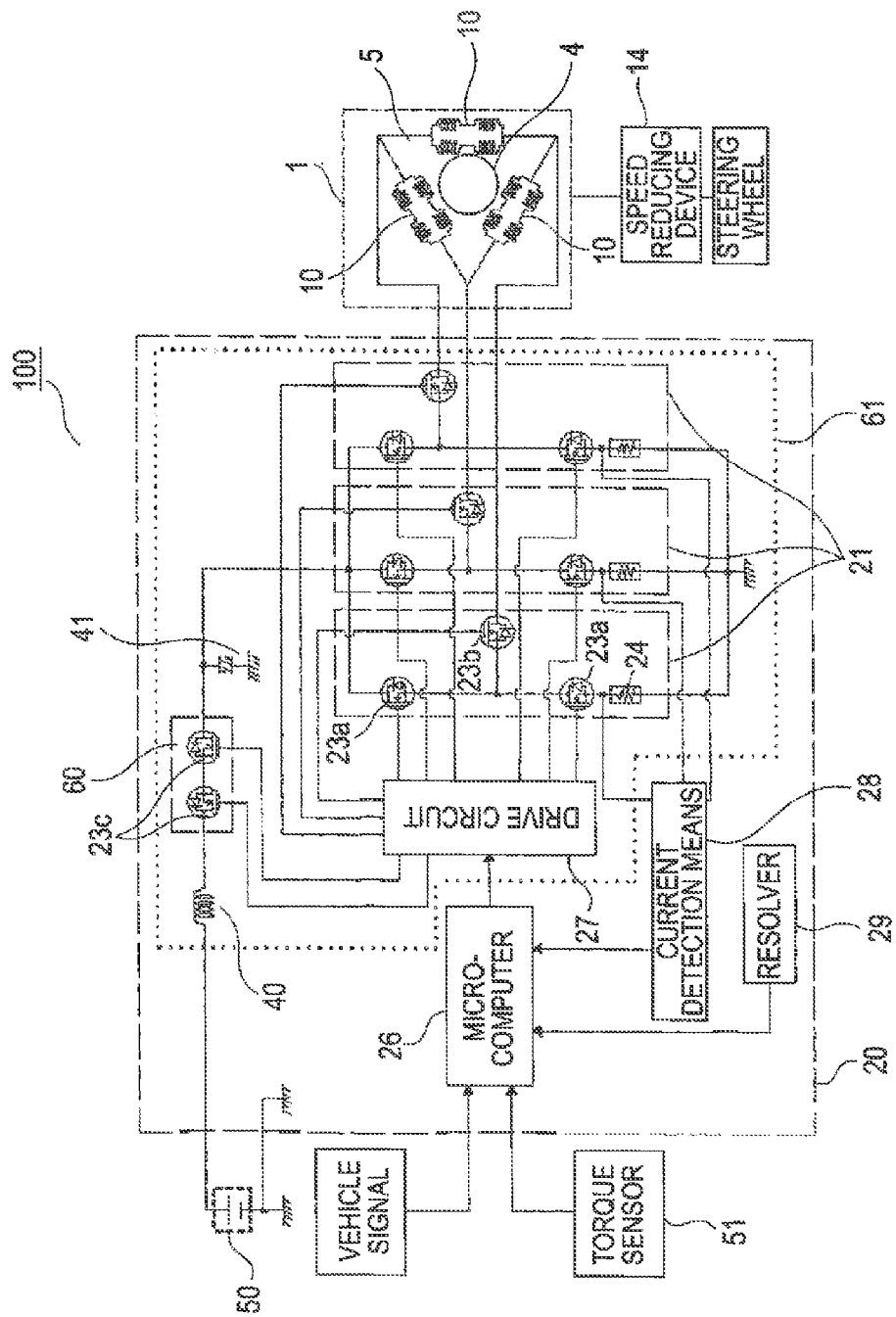
FIG. 3 is a circuit diagram of the electric drive unit 100 according to the first embodiment of the invention.

FIG. 1 through FIG. 3 are, respectively, a cross section, an exploded perspective view, and a circuit diagram of an electric drive unit 100 according to the first embodiment of the invention. The electric drive unit 100 according to the first embodiment of the invention is an electric drive unit employed in an electric power steering apparatus and includes an electric motor 1 that outputs an assist torque to a steering wheel of a vehicle and a control apparatus 20 that controls the driving of the electric motor 1.

The electric motor 1 is a three-phase brushless motor and includes a rotation shaft 2, a rotor 4 formed of a cylindrical permanent magnet having, for example, ten magnetic polarity poles and fixed to the rotation shaft stator 5 provided so as to surround the rotor 4, an iron yoke 6 used to fix the stator 5, and a coupling 7 fixed at an end the rotation shaft 2 to transmit a torque of the electric motor 1.

The stator 5 has, for example, 12 salient poles 8 opposing an outer periphery of the permanent magnet 3 and armature windings 10 wound via insulators 9 attached to the salient poles 8 and connected to three phases including phases U, V, and W. The armature windings 10 are, for example, delta connected. Respective winding ends are crimped with three terminals (intermediate members) 12U, 12V, and 12W supported on a doughnut-shaped holder 11 made of an insulating resin material and connected by joining means, such as welding. Herein, the permanent magnet 3 has ten polarity poles and the stator 5 has 12 salient poles. It should be appreciated, however, that the invention is not limited to this combination and a combination of different numbers of the polarity poles and the salient poles is also applicable. Further, the armature windings 10 are delta connected herein. It should be appreciated, however, that the invention is not limited to this configuration and a star-connection is also applicable.

The holder 11 of an annular shape is provided with as many concave groove portions (supporting portions) 11a as terminals 12 in a concentric fashion. The respective arc-like terminals 12 are supported on the groove portions 11a. The terminals 12 are crimped with motor terminals (first terminal) 13 provided in an equal number to the number of the terminals 12 and extending parallel to an axis line of the rotation shaft 2 from the electric motor 1 toward the control apparatus 20, and connected by joining means, such as welding. In this instance, the motor terminals 13 are located on a radially outer side than the groove portions 11a.

The terminals 12 are made of copper alloy having lower heat-resistant creep characteristics than the motor terminals 13. The term, creep, referred to herein means deformation occurring after an elapse of certain time in a material kept at a constant temperature under a constant stress. A material having high heat-resistant creep characteristics means a material that undergoes a small degree of heat-induced deterioration with time (degree of deformation) under a constant stress.

Figure 4:
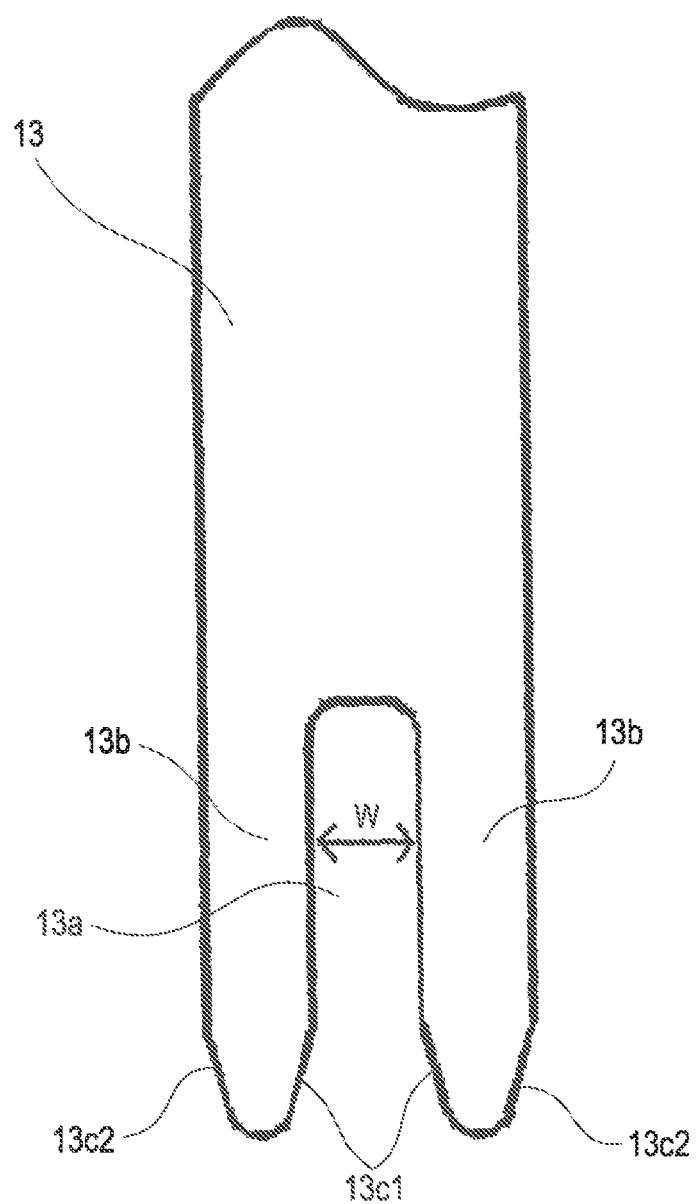
FIG. 4 is a front view of a major portion of a motor terminal 13 of FIG. 1.

The motor terminals 13 will now be described with reference to FIG. 1 and FIG. 4. FIG. 4 is a front view of a major portion of the motor terminal 13 of FIG. 1.

As is shown in FIG. 4, the motor terminal 13 is, for example, of a column shape and provided with a slit 13a at an end on the side of the control apparatus 20. Two arm portions 13b are formed by this slit 13a. Also, as is shown in FIG. 1, an end on the side of the electric motor 1 (opposite side to the side where the slit 13a is provided) is bent in the shape of a capital L by a bending portion 13d and forms an end face 13e perpendicular to an axial direction of the rotation shaft 2. Tapers 13c1 are provided on the both sides of the slit 13a at tip ends of the respective arm portions 13b on the side where the slit 13a is provided (on the inner side of the motor terminal 13, see FIG. 4) in such a manner that a slit width W increases gradually toward the tip ends, that is, a width of the arm portions 13b decreases gradually The end face 13e is supported on an abutment surface lib of the holder 11 by abutting thereon in the axial direction. In the first embodiment, tapers 13c2 are also provided at the tip ends of the arm portions 13b on the sides where the slit 13a is not provided (on the outer side of the motor terminal 13, see FIG. 4).

The motor terminal 13 is formed by press working a plate material of copper alloy used for in-vehicle connectors or the like, which is special copper alloy having high conductivity, high strength, and higher heat-resistant creep characteristics than motor connection terminals 34 described below. After the plate material is pressed, the pressed surface is treated with plating using, for example, tin.

The control apparatus 20 will now be described. The control apparatus 20 that controls the driving of the electric motor 1 includes power modules (semiconductor modules) 21 and a relay module (semiconductor module) 60 formed by encapsulating semiconductor switching elements 23 in mold resin, a control board 25 formed of an insulating printed circuit board, passive elements (coil 40 and capacitor 41) connected to the semiconductor switching elements 23, a frame in which a plurality of conducting plates 33 are insert-molded with insulating resin, a heat sink 35 made of aluminum die cast, a power connector 37 electrically connected to a battery 50 of the vehicle, a signal connector 38 through which signals are inputted from and outputted to the vehicle end via an outside wiring, a torque sensor connector 39 through which signals are inputted from and outputted to a torque sensor 51 via an outside wiring, a housing 36 made of aluminum die cast and used to fix the yoke 6, and a resolver 29 as a rotation position sensor that detects a rotation position of the rotor 4. The resolver 29 has a resolver rotor 29a and a resolver stator 29b. The above has described a case where a rotation position sensor is used as the resolver 29. It should be appreciated, however, that the invention is not limited to this case and other magnetic detection elements, for example, a magneto-resistance element and a hall IC, are also applicable.

Figure 5A:
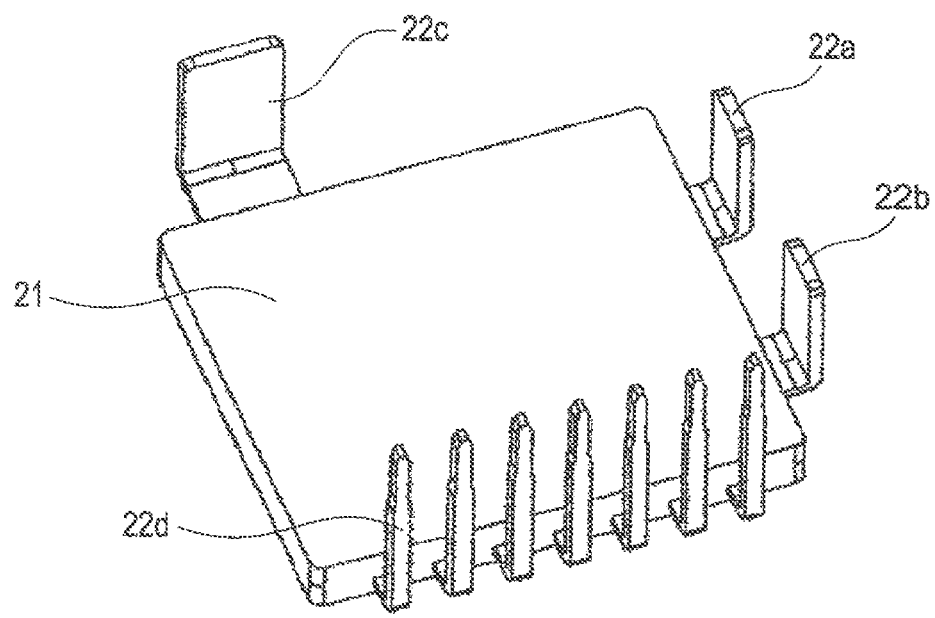
FIG. 5A is a perspective view of the power module 21 alone and FIG. 5B is a perspective view of the power module 21 of FIG. 5A after the motor connection terminal 34 is welded thereto.
Figure 5B:
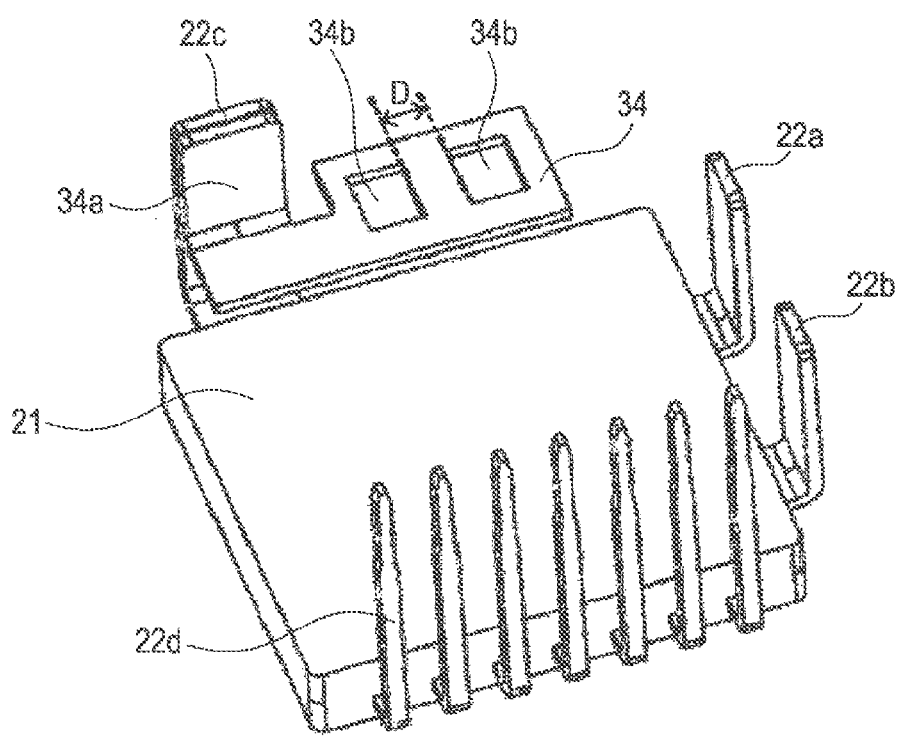

The power modules 21 will now be described with reference to FIG. 1, FIG. 3, and FIG. 5. FIG. 5 is a perspective view of the power module 21 of FIG. 1. FIG. 5A is a perspective view of the power module 21 alone. FIG. 5B is a perspective view of the power module 21 of FIG. 5A after the motor connection terminal 34 is welded thereto.

The power module 21 is a module of a transfer mold type including FETs 23a forming a three-phase bridge circuit used to switch a motor current IM of the electric motor 1 according to the magnitude and a direction of an assist torque, an FET 23b forming a motor relay serving as switch means for passing and interrupting the motor current IM to be supplied to the electric motor 1 from the three-phase bridge circuit, and a shunt resistor 24 interposed between the three-phase bridge circuit and the earth ground, which are mounted by soldering on a lead frame 22 made of copper or copper alloy and provided with a wiring pattern, and then encapsulated in insulating resin and molded into a single piece.

Also, as is shown in FIG. 5A, the power module 21 includes module power terminals 22a and 22b that feed power to the FETs 23a built therein, a module motor connection terminal 22c that feeds power from the power module 21 to the electric motor 1, and module signal terminals 22d that control the FETs 23a and 23b. The module signal terminals 22d of the power module 21 are connected by soldering to a through-hole in the control board 25 described below. Also, as is shown in FIG. 5B, the module motor connection terminal 22c of the power module 21 is connected by welding to the motor connection terminal (second terminal) 34 of the frame 30 described below. Further, the module power terminals 22a and 22b are individually joined by welding to the conductive plates 33 of the frame 30 described below.

The relay module 60 is a module of a transfer mold type including FETs 23c serving as switch means for passing and interrupting a power-supply current IB from the battery 50 and mounted on the lead frame 22 by soldering, and, as with the power modules 21, the FETs 23c are encapsulated in insulating resin and molded into a single piece.

The electric motor 1 in the electric drive unit 100 of the first embodiment is a three-phase brushless motor. As can be understood from FIG. 1 and FIG. 3, the control apparatus 20 includes three power modules 21 and one relay module 60, that is, a total of four semiconductor modules. As is shown in FIG. 2, these four semiconductor modules are disposed at a pitch of about 90 degrees regular intervals with respect to a circumferential direction of the control apparatus 20.

The control board 25 is formed of a multi-layer (for example, four-layer) glass epoxy substrate and provided with the through-hole in which the module signal terminals 22d are inserted. The module signal terminals 22d are soldered to the through-hole and thus electrically connected to the wiring pattern on the control board 25. Mounted on the control board 25 by soldering are a micro-computer 26 that computes an assist torque on the basis of a steering torque signal from the torque sensor 51 and also computes a current corresponding to the assist torque by feeding back the motor current IM and a rotation position of the rotor 4 of the electric motor 1 detected by the resolver 29, a drive circuit 27 that outputs a drive signal driving the FETs 23a according to a command from the micro-computer 26, and current detection means 28 connected to an end of the shut resistor 24 for detecting the motor current IM flown to the electric motor 1. Although it is not shown in the drawings, the micro-computer 26 includes a known self-diagnosis function in addition to an A-to-D converter, a PWM timer circuit, and so on. Hence, the micro-computer 26 constantly makes a self-diagnosis as to whether the system is operating normally and interrupts the motor current IM upon occurrence of an abnormality.

A drive portion 61 that drives the electric motor 1 is formed of semiconductor switching elements 23 (FETs 23a) switching a current of the electric motor 1, passive elements (coil 40 and capacitor 41) electrically connected to the switching elements 23, the drive circuit 27 that outputs a drive signal driving the FETs 23a, peripheral circuit elements, and so on. The coil 40 removes electromagnetic noises generated during switching operations of the semiconductor switching elements 23. The capacitor 41 absorbs ripple components of the motor current IM flown to the electric motor 1. Upon input of a rotation direction command and a current control amount from the micro-computer 26, the drive circuit 27 generates a PWM drive signal, which is applied to the FETs 23a. Accordingly, a power-supply current IB from the battery 50 flows to the electric motor 1 via the power connector 37, the coil 40, and the FETs 23a and 23b, and an assist torque in a required direction and a required amount is outputted.

The motor current IM contains ripple components due to switching operations of the FETs 23a under the PWM driving control. However, the motor current IM is controlled after it is smoothened by the capacitor 41.

Figure 6A:
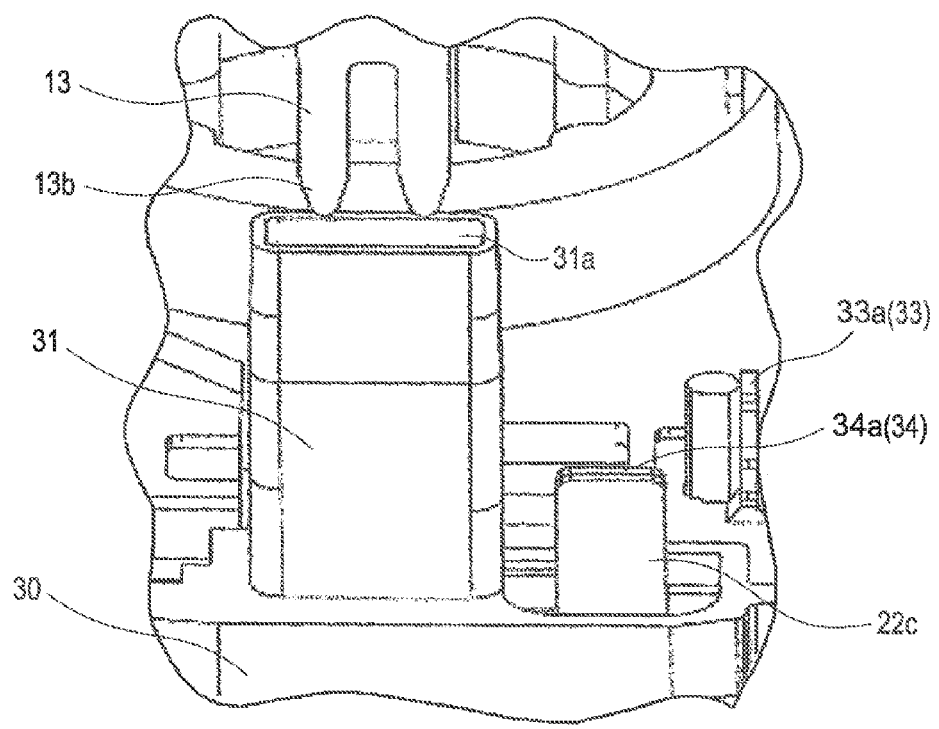
FIG. 6A is an overall view of the guide portion 31 and FIG. 6B is a view showing the vicinity of the motor connection terminal.
Figure 6B:
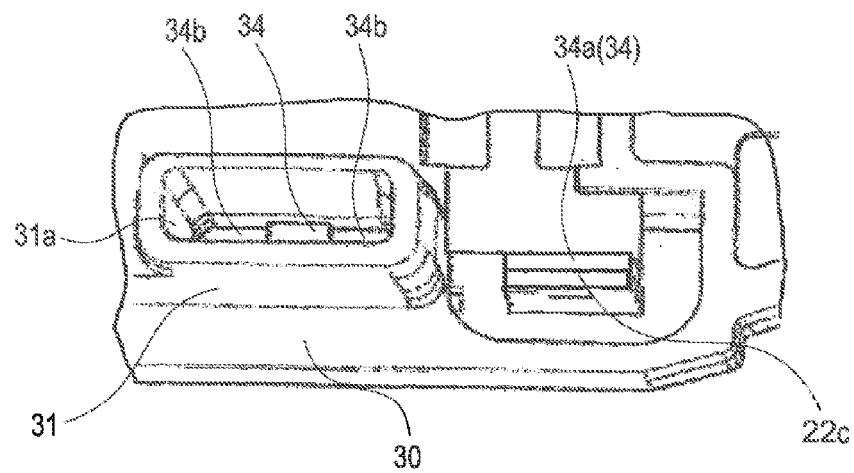

The frame 30 will now be described with reference to FIG. 1 and FIG. 6. FIG. 6 is a perspective view of a major portion of the frame 30 when the motor terminal 13 is in proximity to a guide portion 31 before the motor terminal 13 is fixed in a state of being press-fit to the motor connection terminal 34. FIG. 6A is an overall, view of the guide portion 31 and FIG. 6B is a view showing the vicinity of the motor connection terminal.

As is shown in FIG. 1, the frame 30 is formed by insert-molding the plurality of conductive plates 33 with insulating resin, which are electrically connected to the module power terminals 22a and 22b of the power modules 21, the coil 40, the capacitor 41, and various connectors (power connector 37, signal connector 38, and torque sensor connector 39). The conductive plates 33 are formed on a plane perpendicular to the rotation shaft 2 and bent in the shape of a capital L at one ends so as to form connection portions 33a exposed from the insulting resin. These connection portions 33a are connected to the module power terminals 22a and 22b, various connectors (power connector 37, signal connector 38, and torque sensor connector 39), the coil 40, and the capacitor 41 by joining means, such as welding.

Also, as is shown in FIG. 6, the motor connection terminals 34 are one type of the conductive plates 33. The motor connection terminals 34 are provided in an equal number to the number of the motor terminals 13 and electrically connected to the motor terminals 13 in a one-to-one correspondence. The motor connection terminals 34 together with the conductive plates 33 are insert-molded in the frame 30 with insulating resin. Alternatively, the motor connection terminals 34 may be formed by being divided from the conductive plates 33, for example, by means of press working after the conductive plates 33 are insert-molded. As with the conductive plates 33, the motor connection terminal 34 is bent in the shape of a capital L at one end and a connection portion. 34a exposed from the insulating resin and the module motor connection terminal 22c are connected by joining means, such as welding.

As is shown in FIG. 5B, the motor connection terminal 34 is provided with insertion holes 34b in which the arm portions 13b of the motor terminal 13 are inserted. A length D between the insertion holes 34b is set to be greater than the slit width W of the motor terminal 13 (see FIG. 4), that is, to satisfy a relation, D>W. By inserting the arm portions 13b into the respective insertion holes 34b, the slit 13a (the respective arm portions 13b on the inner side of the motor terminal 13) sandwiches the inner sides of the respective insertion holes 34b. Hence, the length D between the insertion holes 34b corresponds to a sandwich width of the motor connection terminal 34 for the motor terminal 13. Also, the motor connection terminals 34 are formed by press working a copper plate in a predetermined shape (size).

Also, as is shown in FIG. 6A, the frame 30 is provided with the guide portions 31 made of insulating resin. The guide portion 31 has an insertion hole 31a in which the motor terminal 13 is inserted and guides the motor terminal 13 se that the slit 13a in the motor terminal 13 can sandwich the motor connection terminal 34. Also, as is shown in FIG. 6B, the insertion hole 31a is of a tapered shape by which an axial cross section of the guide portion 31 becomes gradually narrower with respect to the axial direction from the side of the electric motor 1 (inlet) to the opposite side to the electric motor 1 (outlet). Hence, a position of the motor terminal 13 is corrected as the motor terminal 13 passes through the insertion hole 31a and it becomes possible to guide the motor terminal 13 to the position at which the motor connection terminal 34 is present. Also, as is shown in FIG. 1, an end face 30a perpendicular to the axis line of the rotation shaft 2 is formed at an end of the frame 30 on the opposite side to the electric motor 1 on the outer side than the guide portion 31.

The heat sink 35 is disposed further on the opposite side to the electric motor 1 than the frame 30. The power modules 21 are fixed in close contact to the heat sink 35 on the side of the electric motor 1 via an insulating member having both a heat conducting property and an insulating property, for example, a ceramic plate (not shown) made of alumina, silicon nitride, or aluminum nitride. Heat conductive grease or adhesive is applied to the ceramic plate.

Also, the frame 30 is fixed with screws (not shown) to the heat sink 35 on the surface to which the power modules 21 are fixed. The coil 40 and the capacitor 41 that are provided to the frame 30 are inserted in a concave portion 35a that is provided to the heat sink 35. Heat conductive grease or adhesive is applied to a clearance between the concave portion 35a provided to the heat sink 35 and these coil 40 and capacitor 41. The heat sink 35 is provided with a supporting portion 35b that supports the frame 30 by abutting on the end face 30a of the frame 30.

The housing 36 is disposed on the axis line of the rotation shaft 2 so as to connect the electric motor 1 and the control apparatus 20 and fastened to the heat sink 35 forming the control apparatus 20 with screws (not shown). The housing 36 together with the heat sink 35 covers the power modules 21, the control board 25, and the frame 30. Also, the housing 36 is fastened to the yoke 6 forming the electric motor 1 with screws (not shown). Liquid packing is applied to a space between the housing 36 and the heat sink 35 and a space between the housing 36 and the electric motor 1. A plate 36a perpendicular to the direction of the rotation shaft 2 of the electric motor 1 is integrally molded with the housing 36. The plate 36a divides a space surrounded by the electric motor 1, the heat sink 35, and the housing 36. The plate 36a is provided with a through-hole 36b through which the rotation shaft 2 passes and a through-hole 36c through which the guide portions 31 passes provided to the frame 30 when the electric motor 1 and the control apparatus 20 are connected.

The connection of the motor terminal 13 and the motor connection terminal 34 will now be described with reference to FIG. 1, FIG. 2, and FIG. 6. As is shown in FIG. 2, in a step when the electric motor 1 is assembled, the motor terminals 13 provided to the electric motor 1 extend parallel to the axial direction of the rotation shaft. 2 from the electric motor 1 toward the control apparatus 20. The arm portions 13h and the slit 13a are provided to the motor terminal 13 at the end on the side of the control apparatus 20.

Also, in a step when the control apparatus 20 is assembled, the housing 36 and the heat sink 35 are fastened with screws and in this instance the guide portions 31 provided to the frame 30 pass through the through-holes 36c provided to the housing 36 and extends toward the electric motor 1. The motor connection terminals 34 provided to the control apparatus 20 are, as is shown in FIG. 1, insert-molded in the frame 30 together with the conductive plates 33.

The electric motor 1 faces the control apparatus 20 in the axial direction of the rotation shaft 2 and the housing 36 fastened to the control apparatus 20 with screws is fastened to the yoke 6 of the electric motor 1 with screws. At the timing at which both the electric motor 1 and the control apparatus 20 are put together, each motor terminal 13 is inserted into the insertion hole 31a in the corresponding guide portion 31. The motor connection terminal 34 is positioned and fixed on the opposite side to the electric motor 1 of the insertion hole 31a. The arm portions 13b of the motor terminal 13 are inserted into the insertion holes 34b of the corresponding motor connection terminal 34. The motor terminal 13 is press-fit to the motor connection terminal 34 as the slit 13a provided to the motor terminal 13 sandwiches the motor connection terminal 34. Consequently, the both terminals are electrically connected in a press-contacting state. Hence, the motor terminal 13 is fixed in a state of being press-fit to the motor connection terminal. 34 at the timing at which the electric motor 1 and the control apparatus 20 are put together. In this instance, as is shown in FIG. 1, the slit 13a in the motor terminal 13 is positioned and fixed in a space (closed space) surrounded by the frame 30, the power modules 21, and the heat 35.

As has been described, the electric drive unit 100 according to the first embodiment of the invention is configured as follows. The control apparatus 20 is disposed on the axis line of the rotation shaft 2 of the electric motor 1. One of the electric motor 1 and the control apparatus 20, herein the electric motor 1 has the motor terminals (first terminal) 13 that extend toward the control apparatus 20, which is the other one. The slit 13a is provided to the motor terminal 13 at an end on the side of the control apparatus 20 (the end on the other side). Also, the control apparatus 20 has the motor connection terminals (second terminal) 34 provided on lines extended from the respective motor terminals 13 to be electrically connected to the corresponding motor terminals. The motor terminal 13 is press-fit to the motor connection terminal 34 as the slit 13a sandwiches the motor connection terminal 34. The both terminals are thus electrically connected.

Accordingly, the number of components is reduced because components, such as screws, are not additionally required to connect the both terminals, and the assembly man-hours are reduced because the step of tightening the screws is omitted. Consequently, the cost can be reduced. In addition, in comparison with a case where a screw installation space and an insertion space for a screw tightening tool are secured separately to tighten the screws, the electric drive unit can be more compact because neither of these spaces is necessary.

Also, because the screws to connect the terminals are no longer required, the cover closing an insertion opening for a screw fastening tool is not required, either. Hence, the number of components and assembly man-hours are reduced. The cost can be thus reduced further.

When the arm portions 13b of the motor terminal 13 are inserted into the insertion holes 34b in the motor connection terminal 34, the arm portions 13b at least on the sides falling on the inner side of the motor terminal 13 undergo a deflection to the outer side of the motor terminal 13, so that the arm portions 13b on the sides falling on the inner side of the motor terminal 13 sandwich a portion between the insertion holes 34b (length D, where D>W) in the motor connection terminal 34. Hence, even when the width of the arm portions 13b of the motor terminal 13 has a dimensional variation and a slight clearance is produced between the arm portions 13b on the sides falling on the outer side of the motor terminal 13 and the insertion holes 34b, the motor terminal 13 and the motor connection terminal 34 are electrically connected. Hence, a dimensional variation of the motor terminal 13 can be absorbed. Productivity of the electric drive unit is thus enhanced.

Further, the motor terminals 13 are fixed in a state of being press-fit to the motor connection terminals 34 at the timing at which the electric motor 1 and the control apparatus 20 are put together. Ease of assembly of the electric drive unit is thus enhanced.

The first embodiment has described a case where the first terminal is the motor terminals 13 of the electric motor 1 and the second terminal is the motor connection terminals 34 of the control apparatus 20. It should be appreciated, however, that these terminals may be reversed, that is, it may be configured in such a manner that the first terminal is the motor connection terminals of the control apparatus and the second terminal is the motor terminals of the electric motor. Even in this case, the slit is provided to the motor connection terminal as the first terminal at an end on the side of the electric motor. Hence, the motor connection terminal is press-fit to the motor terminal as the slit sandwiches the motor terminal as the second terminal and the both terminals are electrically connected. Hence, the number of components is reduced because components, such as screws, are not additionally required to connect the both terminals, and the assembly man-hours are reduced because the step of tightening the screws is omitted. Consequently, the cost can be reduced.

Also, the above has described the electric drive unit 100 of the first embodiment in a case where the slit 13a provided to the motor terminal 13 at the end on the side of the control apparatus 20 is divided to two parts at the tip end so as to form the two arm portions 13b, it should be appreciated, however, that the invention is not limited to this case and the slit 13a may be divided to three or more parts in the same plane so as to form three or more arm portions. In this case, press-fit points between the motor terminal and the motor connection terminal are increased. Hence, a press-fit force is increased and the former is press-fit to the latter in a more reliable manner. Also, even in a case where the arm portions are formed by dividing the tip end of the motor terminal to a plurality of parts on a plurality of planes, such as in the shape of a cross or a capital H, the motor terminal is press-fit to the motor connection terminal as the arm portions of the motor terminal sandwich the insertion holes in the motor connection terminal from all sides. Hence, the same advantage can be achieved.

Also, the control apparatus 20 of the electric drive unit 100 according to the first embodiment of the invention includes the drive portion 61 driving the electric motor 1 and formed of the semiconductor switching elements 23 (FETs 23a) that switch a current of the electric motor 1 and the passive elements (coil 40 and capacitor 41) electrically connected to the semiconductor switching elements 23, and the frame 30 in which the plurality of the conductive plates 33 to be connected to the respective terminals of the passive elements are insert-molded with insulating resin and which is provided with the passive elements. Hence, the passive elements can be connected collectively by joining means, such as welding, in an assembling stage of the control apparatus 20, and a passive element connection time can be shorter. Ease of assembly of the electric drive unit can be thus enhanced.

The passive elements are provided to the frame 30 on the side of the heat sink 35 (one side of the frame 30). Hence, an installation space for the passive elements can be secured efficiently. The electric drive unit can be thus made more compact.

In the first embodiment, the module power terminals 22a and 22b of the power module 21 are connected to the conductive plates 33 of the frame 30 while the module motor connection terminal 22c of the power module 21 is connected to the motor connection terminal 34 of the frame 30. Hence, in addition to the passive elements, the terminals (module power terminals 22a and 22b and the module motor connection terminal 22c) of the power modules 21 can be connected collectively by joining means, such as welding. Hence, an attaching time of the electronic parts (passive elements and power modules) can be shorter Ease of assembly of the electric drive unit is thus enhanced further.

Also, two arm portions 13b are formed by the slit 13a in the motor terminal 13. The tapers 13c1, which are tip ends of the respective arm portions 13b on the inner side of the motor terminal 13 and have a slit width that gradually increases toward the tip ends, are provided on the both sides of the slit 13a. Hence, when the slit 13a in the motor terminal 13 sandwiches the motor connection terminal 34, portions of the tapers 13c1 provided on the inner side of to the motor terminal 13 (on the side where the slit 13a is provided) serve as a guide that introduces the slit 13a between the insertion holes 34b provided to the motor connection terminal 34. The slit 13a is therefore allowed to sandwich the motor connection terminal 34 smoothly. Ease of assembly of the electric drive unit is thus enhanced.

Moreover, in the first embodiment of the invention, the tapers 13c2, which are tip ends of the arm portions 13b on the outer side of the motor terminal 13 (on the side where the slit 13a is not provided), are also provided. The tapers 13c2 serve as a guide that introduces the arm portions 13b into the respective insertion holes 34b provided to the motor connection terminal 34. The motor terminal 13 is therefore inserted into the insertion holes 34b smoothly. Hence, a dimensional variation of the slit width W of the motor terminal 13 and the length D between the insertion holes 34b in the motor connection terminal 34 can be absorbed.

Also, the end of the motor terminal 13 on the side of the electric motor 1 (opposite side to the side where the slit 13a is provided) is bent in the shape of a capital L by the bending portion 13d and forms the end face 13e perpendicular to the axial direction of the rotation shaft 2. The end face 13e is supported on the abutment surface lib of the holder 11 as an abutment member by abutting thereon. Accordingly, a load applied to the motor terminal 13 when the motor terminal 13 is press-fit to the motor connection terminal 34 is received by the entire holder 11 via the abutment surface 11b. An amount of deformation (an amount of deflection) of the motor terminal 13 therefore becomes smaller than in a case where a full load applied to the motor terminal 13 is received by the end face 13e alone. Hence, the motor terminal 13 undergoes deformation by buckling or the like less frequently. It thus becomes possible to provide an electric drive unit with enhanced reliability.

Moreover, the motor terminal 13 is fixed by allowing the end face 13e of the motor terminal 13 to abut on the abutment surface lib of the holder 11. Accordingly, when the terminal 12 and the motor terminal 13 are crimped and connected by joining means, such as welding, position gap of the motor terminal 13 becomes smaller. Ease of assembly and the reliability of the electric drive unit are thus enhanced.

In the electric drive unit 100 after the motor terminals 13 are press-fit to the motor connection terminals 34 and fixed, a linear expansion difference or the like is generated among the materials due to vibrations and a temperature change of the electrical drive unit. In this instance, stress that weakens a press-fit force of the motor terminal 13 is generated. However, because the bending portion 13d is formed in the shape of a capital L by bending the motor terminal 13 and the L-shaped portion forms an elastic portion of the motor terminal 13. Hence, stress generated by vibrations of the electric drive unit, a linear expansion difference of the motor terminals 13, and so on is eased. The reliability of the electric drive unit is thus enhanced.

Also, the motor terminals 13 are made of copper metal having higher heat-resistant creep characteristics than the motor connection terminals 34. Hence, a degree of deterioration with time of the press-fit fixed portions becomes smaller. It thus becomes possible to provide an electric drive unit with enhanced reliability. In the first embodiment of the invention, the motor terminals 13 are made of copper alloy having higher heat-resistant creep characteristics than the motor connection, terminals 34, and more particularly, special copper alloy also having high conductivity and high strength. Hence, in addition to the advantage that a degree of deterioration with time of the press fit fixed portions is small, an amount of heat generation of the motor terminals becomes smaller and the strength becomes higher. It thus becomes possible to provide an electric drive unit with further enhanced reliability.

Also, the motor terminals 13 are crimped with the armature windings 10 via the terminals which are intermediate members, and electrically connected by joining means, such as welding. The terminals 12 are made of copper alloy having lower heat-resistant creep characteristics than the motor terminals 13. Generally, copper alloy having high heat-resistant creep characteristics is a special material and has a small degree of deterioration with time against deformation or the like whereas the price is high. Hence, in a case where the motor terminals and the armature windings are electrically connected directly by joining means, such as welding, an amount of used special material is increased and the cost becomes higher. However, in the first embodiment, a part of the motor terminals 13 except for the press-fit fixed portions does not require the heat-resistant creep characteristics in comparison with the press-fit fixed portions. Hence, by forming this part using the terminals 12 having lower heat-resistant creep characteristics than the press-fit fixed portions and forming the press-fit fixed portions alone using the motor terminals 13, an amount of used special material is reduced. The cost of the electric drive unit is thus reduced.

Also, the electric motor 1 according to the first embodiment of the invention is a three-phase motor, and the holder 11 is provided with the supporting portion 11a that supports the terminals 12. The three terminals 12U, 12V, and 12W are crimped with three motor terminals 13U, 13V, and 13W, respectively, and connected by joining means, such as welding. Each motor terminal 13 is located on the radially outer side than the supporting portion. 11a. Hence, in comparison with a case where the motor terminals 13 are located on the radially inner side than the supporting portion 11a, an insulating distance between each motor terminal 13 and the terminals 12 of different phases can be extended. The reliability of the electric drive unit is thus enhanced. Also, the joining parts of the motor terminals 13 and the terminals 12 are located on the radially outer side. Hence, a space necessary to connect the both terminals by joining means can be secured. Ease of assembly of the electric drive unit is thus enhanced.

Further, the motor connection terminals 34 are provided on lines extended from the motor terminals 13 so as to receive the press-fitting of the motor terminals 13. Because the three motor terminals 13 are located on the radially outer side than the supporting portion 11a, the three motor connection terminals 34 provided on the lines extended from the three motor terminals 13 are also located on the radially outer side. Hence, the three motor connection terminals 34 do not receive the press-fitting of the three motor terminals 13 concentrating in the vicinity of the rotation shaft 2 on the radially inner side. Instead, the three motor connection terminals 34 can receive a press-fitting load on the radially outer side by distributing the press-fitting load. The reliability of the electric drive unit is thus enhanced. Also, an insulating distance of the motor connection terminals 34 can be secured. The reliability of the electric drive unit is thus enhanced further.

Also, the control apparatus 20 according to the first embodiment of the invention includes the three power modules 21 and one relay module 60, that is, a total of four semiconductor modules. These semiconductor modules are located at a pitch of about 90 degrees regular intervals with respect to a circumferential direction of the control apparatus 20. The three motor terminals 13U, 13V, and 13W are also located at a pitch of about 90 degrees regular intervals in a manner so as to correspond to the three power modules 21. By locating the three motor terminals 13 at a pitch of 90 degrees regular intervals in this manner, it becomes possible to secure a sufficient insulating distance among the respective motor terminals 13. The reliability of the electric drive unit is thus enhanced.

Also, the frame 30 is provided with the guide portions 31 in which the motor terminals 13 is inserted. When the motor terminal 13 sandwiches the motor connection terminal 34, the guide portion 31 serves as a guide that corrects a position of the motor terminal 13 to be the position at which the motor connection terminal 34 is present. The motor terminal 13, which is guided by the guide portion 31, is therefore allowed to sandwich the motor connection terminal 34. Ease of assembly of the electric drive unit is thus enhanced.

The first embodiment has described a case where the guide portions 31 are formed as a separate component from the frame 30. It should be appreciated, however, that the invention is not limited to this case. Because both of the frame 30 and the guide portions 31 are molded from insulating resin, the both components can be molded integrally into a single piece. By integrally molding the frame 30 and the guide portions 31 from insulating resin, assembly man-hours are reduced, which can in turn reduce the cost. Moreover, in comparison with a case where the both components are formed separately, the positional accuracy of the guide portions 31 is enhanced. Hence, not only is ease of assembly of the electric drive unit enhanced further, but the reliability of the electric drive unit is also enhanced.

Further, as is shown in FIG. 6, because the guide portions 31 in the first embodiment are formed so as to cover the periphery of the motor terminals 13, insulating properties can be ensured. The reliability of the electric drive unit is thus enhanced further.

The motor connection terminals 34 are insert-molded in the frame 30 with insulating resin. Hence, when the frame 30 is formed, the both ends of the motor connection terminals 34 are fixed with the insulating resin. Accordingly, when the motor terminals 13 are fixed in a state of being press-fit to the motor connection terminals 34, a load applied to the motor connection terminals 34 during the press-fitting is applied uniformly without concentrating to any point and a load received by the motor connection terminals 34 can be received by the entire frame 30. Hence, deformation and damage of the motor connection terminals 34 can be prevented. The reliability of the electric drive unit is thus enhanced.

When the motor connection terminals 34 are insert-molded in the frame 30 with the insulating resin, the position of the motor connection terminals 34 is fixed. Hence, position gap of the motor connection terminals 34 becomes smaller, which allows the motor terminals 13 to sandwich the motor connection terminals 34 in a reliable manner. Ease of assembly of the electric drive unit is thus enhanced.

Further, the frame 30 is provided with the guide portions in which the motor terminals 13 are inserted. A relative position of the motor terminals 13 with respect to the frame 30 is determined uniquely by the guide portions 31 and, as has been described above, a relative position of the motor connection terminals 34 with respect to the frame 30 is al determined uniquely. Hence, the relative positions of the motor terminals 13 and the motor connection terminals 34 with respect to the frame 30 are determined uniquely and position gap of the both terminals becomes smaller. Ease of assembly and the reliability of the electric drive unit are thus enhanced further.

Moreover, by insert-molding the guide portions 31 in the frame 30 in addition to the motor connection terminals 34, assembly man-hours are reduced and hence the cost can be reduced. Also, the relative positions of the motor connection terminals 34 and the guide portions 31 with respect to the frame 30 are determined uniquely and position gap of the guide portions 31 and the motor connection terminals 34 becomes smaller. Hence, positional accuracy of the both terminals is enhanced. Ease of assembly and the reliability of the electric drive unit are thus enhanced. It should be also noted that by insert-molding the motor connection terminals 34 in the frame 30, assembly man-hours are reduced and hence the cost can be reduced.

The lead frame 22 of the power module 21 is pressed into a required shape by punching or the like and the FETs 23a and 23b and the shunt resistor 24 are mounted thereon. These components are encapsulated in mold resin and an unwanted portion is removed. Then the lead frame 22 is bent in a direction perpendicular to the surface on which the FETs 23a and 23b are mounted (see module power terminals 22a and 22b, module motor connection terminal 22c, and module signal terminals 22d of FIG. 5).

The lead frame 22 before the press working is of a shape before the lead frame 22 bent. Hence, when the lead frame has a long length, an unwanted portion generally increases and the cost of the lead frame is increased. However, in the first embodiment, the motor connection terminals 34 are insert-molded in the frame 30 to which the power modules 21 are provided. Also, of the lead frame 22, the module motor connection terminal. 22c is connected to the motor connection terminal 34 by joining means, such as welding. Hence, the length of the module motor connection terminal 22c becomes shorter and an amount of used material of the lead frame 22 is reduced comparably. The cost can be thus reduced.

The frame 30 is provided with the end face 30a perpendicular to the axis line of the rotation shaft 2 on the outer side than the guide portions 31 and at the end on the opposite side to the electric motor 1. The end face 30a abuts on the supporting portion 35b provided to the heat sink 35 serving as a supporting member and the heat sink 35 supports the frame 30 provided with the guide portions 31. According to this configuration, a load received by the frame 30 when the motor terminals 13 are inserted into the guide portions is received by the entire heat sink 35 via the supporting portion 35b. Hence, an amount of deflection of the frame 30 becomes smaller than in a case where a full load applied to the frame 30 is received by the end face 30a alone. Accordingly, deformation and damage of the frame 30 can be prevented. The reliability of the electric drive unit is thus enhanced.

Moreover, by insert-molding the motor connection terminals 34 in the frame 304, assembly man-hours are reduced and hence the cost can be reduced. Also, a load received by the motor connection terminals 34 when the motor terminals 13 are press-fit to the motor connection terminals 34 can be received by the entire frame 30. Hence, the motor connection terminals 34 do not undergo deformation due to the press-fitting. It thus becomes possible to provide an electric drive unit with enhanced reliability.

Also, the motor connection terminals 34 are not formed of a thick portion of a copper plate (for example, a thin plate having a plate thickness of 1 mm) in compliance with the JIS standards but by press working a plane portion of the copper plate into a predetermined shape (size). Hence, because the sandwich width of the motor connection terminals 34 (the length D between the insertion holes 34b) can be set arbitrarily according to an output, the environment of usage, and a purpose of the electric motor 1, a degree of freedom in design of the electric drive unit is enhanced. Also, the motor terminals 13 are formed by press working a plate material of copper alloy. Hence, as with the motor connection terminals 34, because a shape of the motor terminals 13 (for example, slit width W<D) can be set arbitrarily according to an output, the environment of usage, and a purpose of the electric motor 1, a degree of freedom in design of the electric drive unit is enhanced.

Also, the motor terminals 13 are formed by press working a plate material and then treating the pressed surface with plating. Accordingly, plated portions of the motor terminals 13 act to fill fine clearances generated between the motor terminals 13 and the motor connection terminals 34 after the arm portions 13b of the former sandwich the portions between the insertion holes 34b of the latter. Hence, an increase of contact resistance occurring between the both terminals is suppressed. Performances of the electric drive unit are thus enhanced. A configuration in which plating is applied to the motor connection terminals 34 instead of the motor terminals 13 and a configuration in which plating is applied to the both terminals are also applicable. It goes without saying that even these configurations can also achieve the advantage that an increase of contact resistance occurring between the both terminals is suppressed to a greater or lesser extent.

Further, the electric motor 1 according to the first embodiment of the invention is a three-phase motor and the three motor terminals 13U, 13V, and 13W are formed separately by press working a plate material and press-fit to three motor connection terminals 34U, 34V, and 34W, respectively. On the contrary, the three motor connection terminals 34 (34U, 34V, and 34W) are provided in the form of a single piece provided with a connection portion to the passive elements for example, the coil 40 by press working a copper plate and insert-molded with insulating resin. The motor connection terminals 34 in the form of a single piece have portions where the plating is not required and are of a large size. Hence, when the plating is applied to required portions, the cost may possibly be increased. In contrast, because the motor terminals 13 formed separately are of a small size and the plating is applied entirely, the plating can be applied at a lower cost. The cost of the unit is thus reduced.

In a case where the motor connection terminals 34 are insert-molded after the plating, there is a risk that electric reliability of the motor connection terminals 34 is deteriorated due to elution of the plating films during the insert molding. It should be noted, however, that the motor terminals 13 are press-fit to the motor connection terminals 34 after the plating. Hence, in this regard, it is more advantageous to apply the plating to the motor terminals 13 in terms of the performance and the cost.

Moreover, in a case where the plating is applied to the both terminals, the motor terminals 13 sandwich the motor connection terminals 34 as the former is inserted into the latter while the plated portions of the both terminals are coming into contact with each other. Accordingly, the insertion becomes smoother. Also, because the both terminals are covered with the plated portions, the surfaces of the terminals are hardly scraped. Hence, because the surface areas of the both terminals are smaller than in a case where the surfaces of the terminals are scraped, the surfaces of the terminals are hardly oxidized and the life of the both terminals becomes longer. It thus becomes possible to extend the life of the unit.

The passive elements, such as the coil 40 and the capacitor 41, and the semiconductor switching elements 23, which together form the drive portion 61, are heat-generating components. The coil 40 and the capacitor 41 are inserted into the concave portion 35a provided to the heat sink 35. The semiconductor modules (power modules 21 and relay module 60) formed by encapsulating the semiconductor switching elements 23 in mold resin are fixed in close contact to the heat sink 35 via a heat-conductive ceramic plate. Heat generated from the heat-generating components (coil 40, capacitor 41, and semiconductor modules) is therefore released to the heat sink 35. A heat-releasing property of the electric drive unit is thus enhanced. Because a temperature rise when the heat-generating components generate heat is suppressed, the reliability of the electric drive unit is enhanced.

Of the heat-generating components, the coil 40 and the capacitor 41 are inserted into the concave portion 35a provided to the heat sink 35. Hence, heat generated from the coil 40 and the capacitor 41 is released by letting the heat transmit to the heat sink 35 from not only the end faces in the axial direction on the side of the heat sink 35 but also from the outer peripheral surfaces. A heat-releasing performance of the electric drive unit is thus enhanced in comparison with a case where heat is released by letting the heat transmit to the heat sink 35 from the end faces in the axial direction on the side of the heat sink 35 alone.

In the first embodiment, contact thermal resistance among the components is reduced by applying heat-conductive grease or adhesive to the ceramic plate and heat release from the coil 40 and the capacitor 41 to the heat sink 35 is promoted by applying heat-conductive grease or adhesive to a clearance between the concave portion 35a in the heat sink 35 and the coil 40 as well as the capacitor 41. The heat-releasing property of the electric drive unit is thus enhanced further.

The electric drive unit 100 is formed by putting the electric motor 1 and the control apparatus 20 together and the motor terminals 13 are inside the electric drive unit 100. Hence, entrance of foreign matter from the outside to a portion of the motor terminals 13 can be prevented. Also, at the timing at which the former and the latter are put together, the slits 13a (arm portions 13b) in the motor terminals 13 are positioned and fixed in the space (closed space) surrounded by the frame 30, the power modules 21, and the heat sink 35. Hence, for example, even when foreign matter (dust, water droplet, and the like) entered into the electric motor 1 from the outside reaches a portion of the frame 30, the frame 30 can prevent the foreign matter from entering further to a portion of the slits 13a (arm portions 13b). It thus becomes possible to ensure a waterproof property and an insulating property of the press-fit fixed portions. It also becomes possible to prevent a residue or the like generated during the press-fitting from flowing out, for example, to the rotor 4 of the electric motor 1.

Also, liquid packing is applied to a space between the housing 36 and the heat sink 35 and a space between the housing 36 and the electric motor 1. Hence, these spaces can be sealed. A waterproof property of the electric drive unit is thus enhanced. In the first embodiment, liquid packing is used as a waterproof structure between the housing 36 and the heat sink 35 (electric motor 1). It should be appreciated, however, that the invention is not limited to this case, and the waterproof structure can be, for example, an O-ring or rubber packing.

A ceramic plate is used as the insulating member between the heat sink 35 and the power modules 21. It should be appreciated, however, that the invention is not limited to this case, and the insulating member can be, for example, an adhesive mixed with a high heat-conductive material, such as alumina, as a filler or a heat-releasing insulating sheet made of a material, such as silicon.

Second Embodiment

Figure 7:
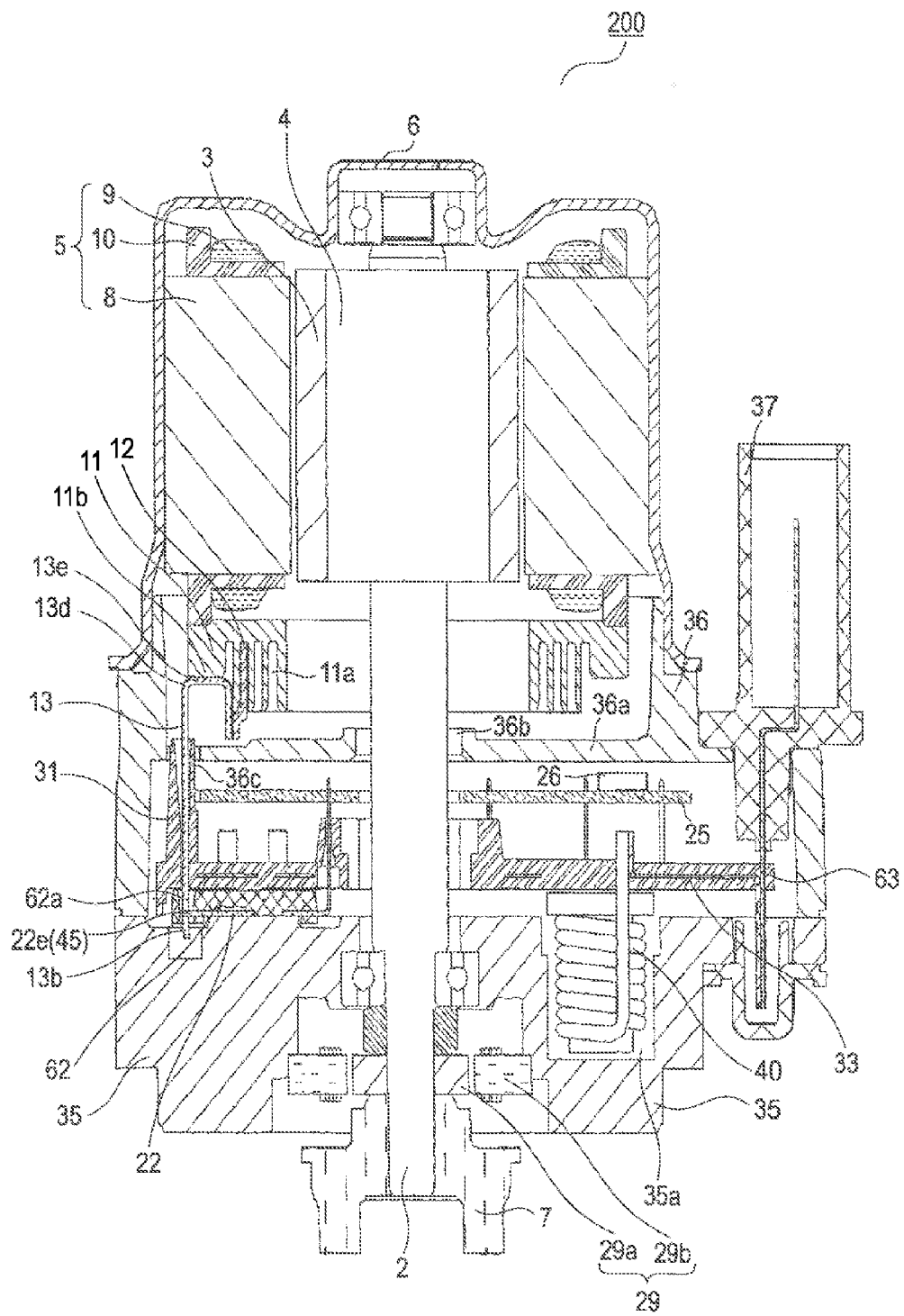
FIG. 7 is a cross section of an electric drive unit 200 according to a second embodiment of the invention.
Figure 8:
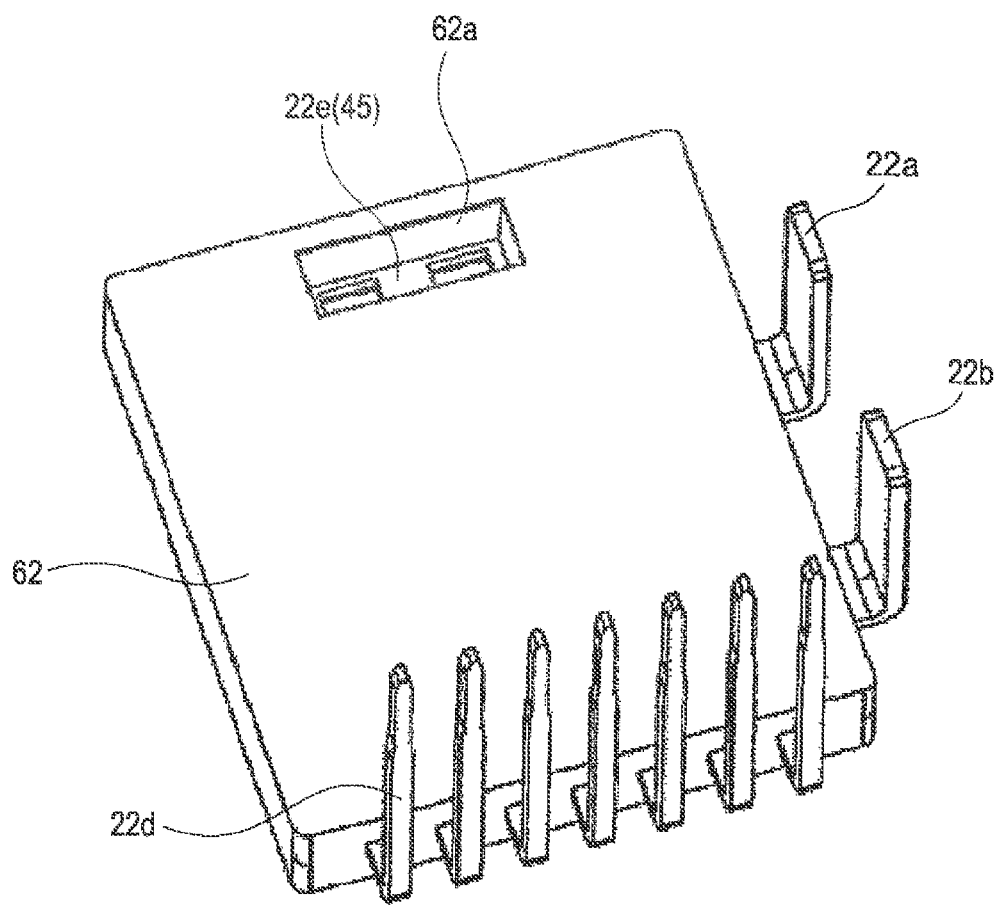
FIG. 8 is a perspective view of a power module 62 of FIG. 7.
Figure 9:
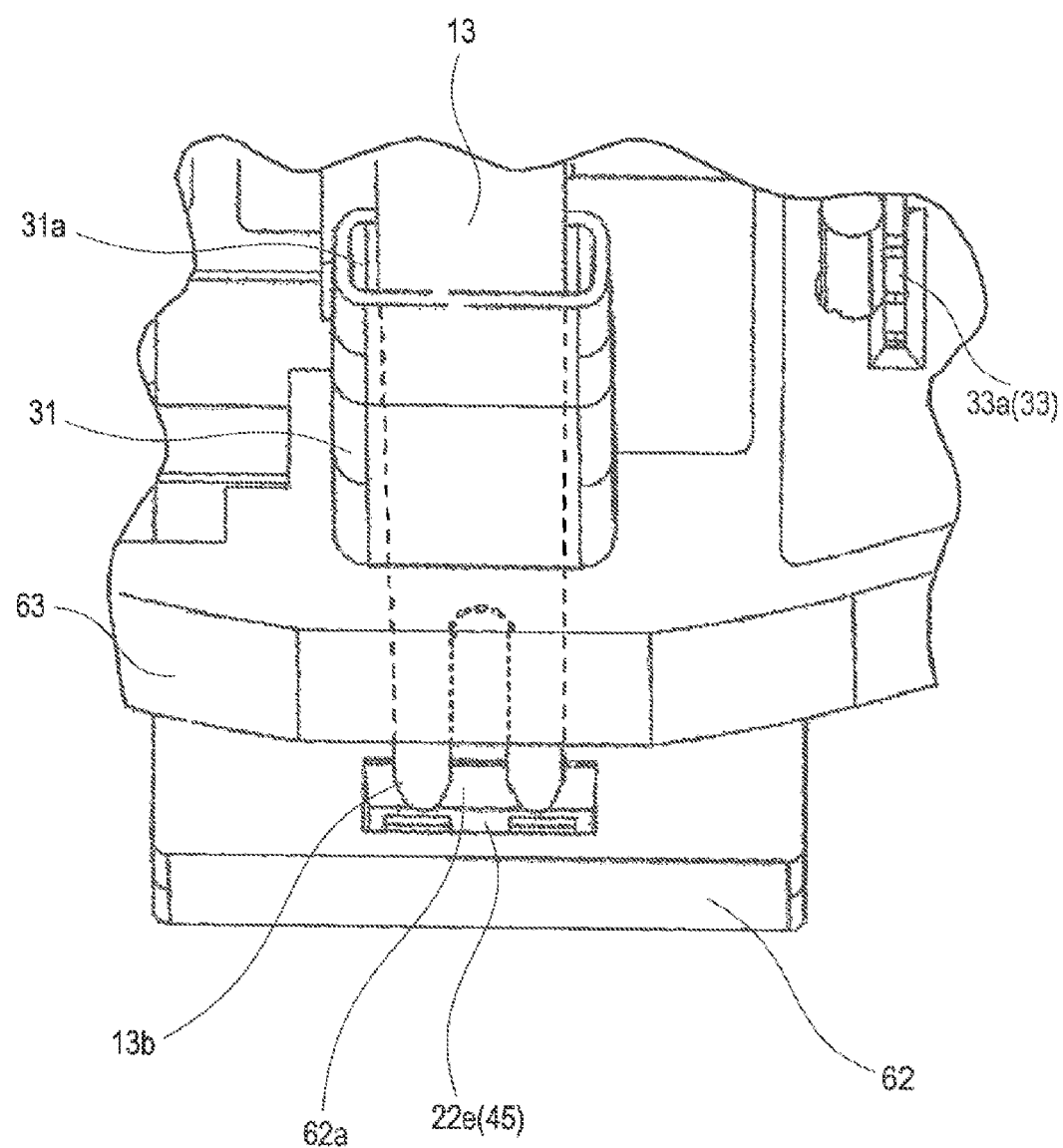
FIG. 9 is a perspective view of a major portion of the power module 62 when the motor terminal 13 is in proximity to an opening 62a before the motor terminal 13 is fixed in a state of being press-fit to a motor connection terminal 45.

A structure of an electric drive unit 200 of a second embodiment will be described using FIG. 7 through FIG. 9. FIG. 7 is a cross section of the electric drive unit 200 according to the second embodiment of the invention. FIG. 8 is a perspective view of a power module 62 of FIG. 7. FIG. 9 is a perspective view of a major portion of the power module 62 when the motor terminal 13 is in proximity to an opening 62a before the motor terminal 13 is fixed in a state of being press-fit to a motor connection terminal 45.

As are shown in FIG. 7 through FIG. 9, a configuration of the power module 62 of the electric drive unit 200 of the second embodiment is different from the configuration of the power module 21 described in the first embodiment above. Also, because the power modules are changed, a shape of a frame 63 is different from the shape of the frame 30 described in the first embodiment above. The rest of the configuration is the same as the electric drive unit 100 of the first embodiment above, and a detailed description is omitted herein.

As is shown in FIG. 8, the power module 62 is provided with the opening 62a in which the motor terminal 13 as the first terminal is inserted. A module motor connection terminal 22e, which is the lead frame 22, is positioned and fixed on the inner side of the opening 62a. The opening portion 62a is of a tapered shape by which the cross section of the opening 62a becomes gradually narrower from the side from which the motor terminal 13 is inserted toward the module motor connection terminal 22e.

The motor terminal 13 is fixed in a press-fit state by sandwiching the module motor connection terminal 22e and the both terminals are electrically connected. Hence, the module motor connection terminals 22e are formed integrally with the motor connection terminals 45 as the second terminal. The motor connection terminals 45 are therefore integrally-molded with the power module 62.

The frame 63 is formed by insert-molding the plurality conductive plates 33 electrically connected to module power terminals 22a and 22b of the power modules 62, the coil 40, the capacitor 41, and various connectors (power connector 37, signal connector 38, torque sensor connector 39) with insulating resin.

As has been described, the electric drive unit 200 according to the second embodiment of the invention further includes, as are shown in FIG. 7 through FIG. 9, the semiconductor modules (power modules 62) formed by encapsulating the semiconductor switching elements (FETs 23a and 23b) in mold resin. The power module 62 is provided with the opening 62a in which the motor terminal (first terminal) 13 is inserted and the motor connection terminal (second terminal) 45 is positioned and fixed on the inner side of the opening 62a. Incidentally, a wiring pattern is provided to the lead frame of the power module and is generally exposed to the outside of the power module. According to the configuration above, however, the module motor connection terminal 22e of the lead frame 22 is positioned and fixed on the inner side of the opening 62a in the power module 62. Hence, the module motor connection terminal 22e is not exposed to the outside and an amount of used material of the lead frame 22 is reduced comparably. The cost can be thus reduced.

Also, the motor connection terminal 45 is formed, on the lead frame 22 as the module motor connection terminal 22e. Hence, it is not necessary to prepare the motor connection terminals 34 as components separate from the module motor connection terminals 22c as in the first embodiment above. The number of components can be thus reduced in comparison with a case in the first embodiment above. In addition, because a work to connect the motor connection terminal 34 and the module motor connection terminals 22c is not necessary, assembly man-hours are reduced, too. Hence, the number of components and the assembly man-hours are reduced and the cost can be reduced.

The motor connection terminals 45 are integrally molded with the power module 62. Hence, the both ends of the motor connection terminal 45, which is the lead frame 22, are fixed with the resin when the power module 62 is formed by encapsulating the FETs 23a and 23b, which are the semiconductor switching elements, in the mold resin. Hence, a load applied to the motor connection terminals 45 during the press-fitting when the motor terminals 13 are fixed in a state of being press-fit to the motor connection terminals 45 is applied uniformly without concentrating to any point. Also, a load received by the motor connection terminals 45 can be received by the entire power modules 62 via the mold resin. Hence, deformation and damage of the motor connection terminals 45 can be prevented. The reliability of the electric drive unit is thus enhanced.

Also, the position of the motor connection terminals 45 is fixed when the motor connection terminals 45 are integrally molded with the power modules 62. Hence, position gap of the motor connection terminals 45 becomes smaller, which allows the motor terminals 13 to sandwich the motor connection terminals 45 in a reliable manner. Ease of assembly of the electric drive unit is thus enhanced.

Also, as with the case in the first embodiment above, the heat sink 35 is located further on the opposite side to the electric motor 1 than the frame 63 and the power modules 62 are fixed in close contact to the heat sink 35 on the side of the electric motor 1 via the ceramic plate The frame 63 is fixed with screws (not shown) to the heat sink 35 on the surface to which the power modules 62 are fixed. By tightening the screws, the frame 63 is fixed to the heat sink 35 in a state of being pressed against the heat sink 35. Hence, when the frame 63 is fixed to the heat sink 35 in a state of being pressed against the heat sink 35 using a fastening force of the screws, positions of the power module 62 and the motor connection terminals 45 positioned and fixed in the openings 62a in the power modules 62 are fixed. Position gap of the motor connection terminals 45 therefore becomes smaller, which allows the motor terminals 13 to sandwich the motor connection terminals 45 in a reliable manner. Ease of assembly of the electric drive unit is thus enhanced.

Also, the opening 62a is of a tapered shape by which the cross section of the opening 62a becomes gradually narrower from the side from which the motor terminal 13 is inserted toward the motor connection terminal 45. Hence, when the motor terminal 13 is inserted into the opening 62a, the motor terminal 13 is guided to be positioned at the position at which the motor connection terminal 45 is present. The motor terminal 13 is therefore allowed to sandwich the motor connection terminal 45 along the taper of the opening 62a. Ease of assembly of the electric drive unit is thus enhanced. As with the first embodiment above, the frame 63 is provided with the guide portions 31 in which the motor terminals 13 are inserted. Hence, by using the tapers of the openings 62a and the guide portions 31 provided to the frame 63 in combination, it becomes possible guide the motor terminals 13 to be positioned where the motor connection terminals 45 are present, which can in turn make position gap smaller. Ease of assembly of the electric drive unit is thus enhanced further.

Third Embodiment

In the respective embodiments above, the motor terminals as the first terminal extend parallel to the axial direction of the rotation shaft from the electric motor toward the control apparatus and are fixed in a state of being press-fit to the motor connection terminals as the second terminal. Also, the motor connection terminals as the second terminal are insert-molded in the frame or positioned and fixed on the inner side of the openings in the power modules. The frame and the power modules are inside the control apparatus at a position relatively remote from the electric motor. Hence, the motor terminals are sufficiently long relatively to the sectional area. Accordingly, when a load is applied to the motor terminals of a long column shape during the press-fitting of the motor terminals and the motor connection terminals, the motor terminals may possibly undergo deformation by buckling or the like. In a third embodiment, the motor terminals are made shorter by positioning and fixing an insulating member to the electric motor side of a housing that connects the electric motor and the control apparatus and by fixing the motor connection terminals to the housing via the insulating member. Hence, the motor terminals 13 undergo deformation by buckling or the like less frequently. It thus becomes possible to provide an electric drive unit with enhanced reliability.

Figure 10:
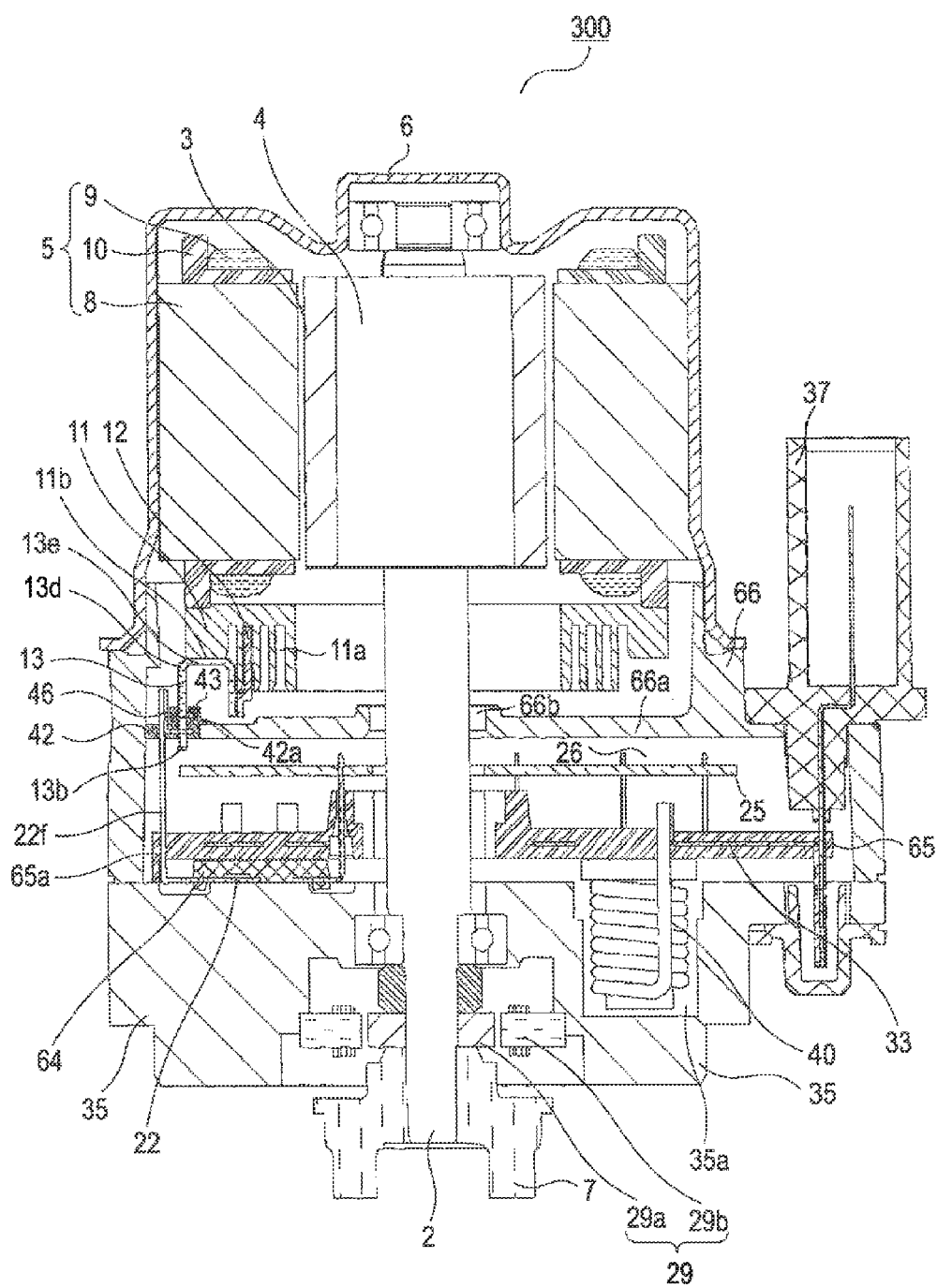
FIG. 10 is a cross section of an electric drive unit 300 according to a third embodiment of the invention.
Figure 11A:
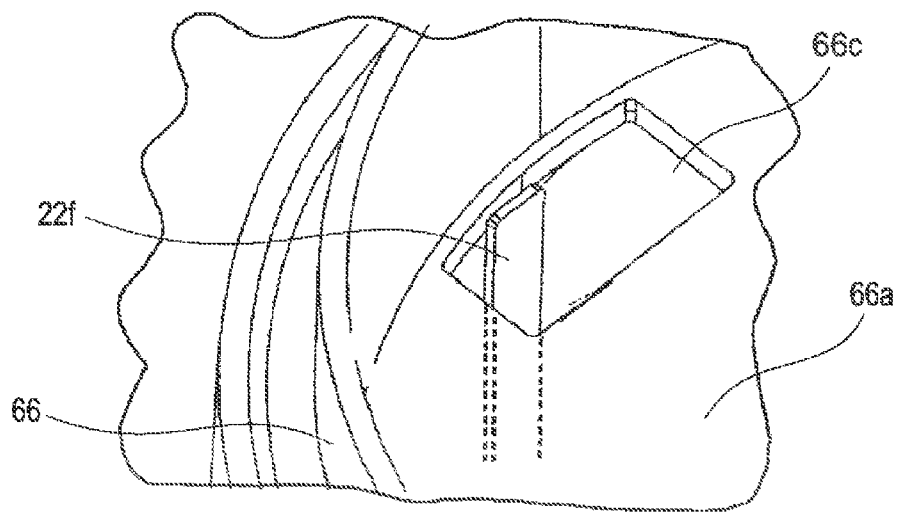
FIG. 11A is a perspective view of a major portion of a power module 64 in the vicinity of a module motor connection terminal 22f and FIG. 11B is a perspective view of the major portion after a motor connection terminal 46 is welded to the module motor connection terminal 22f of FIG. 11A.
Figure 11B:
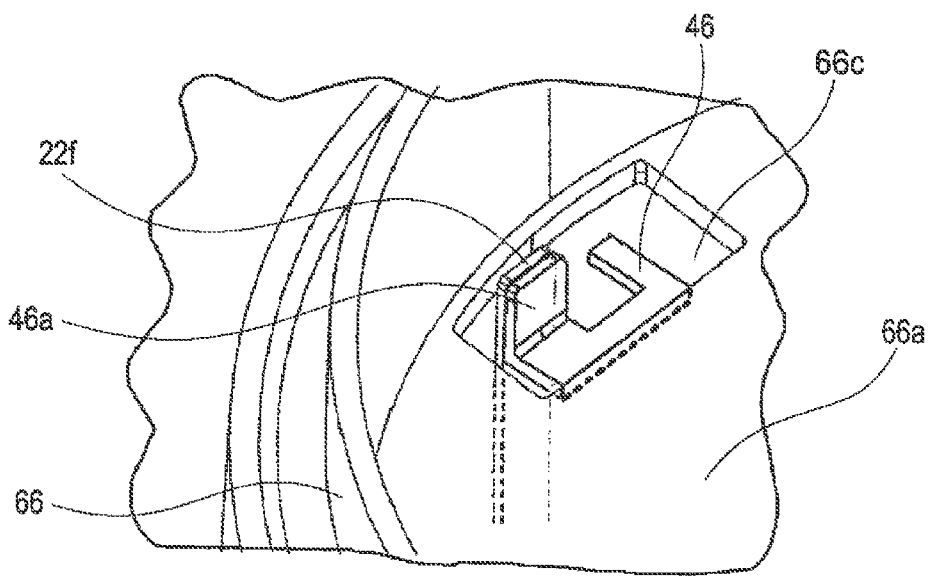
Figure 12:
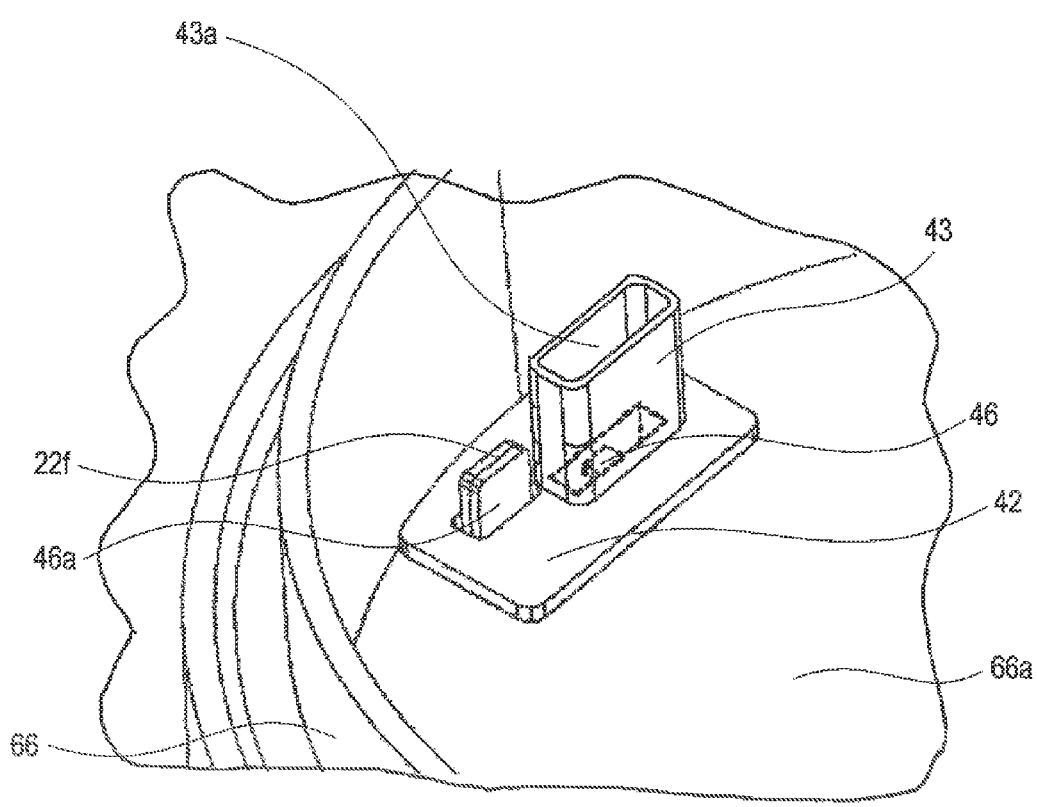
FIG. 12 is a perspective view of a major portion of the housing 66 before an electric motor 1 and a control apparatus 20 are connected in the electric drive unit 300 of FIG. 10.
Figure 13:
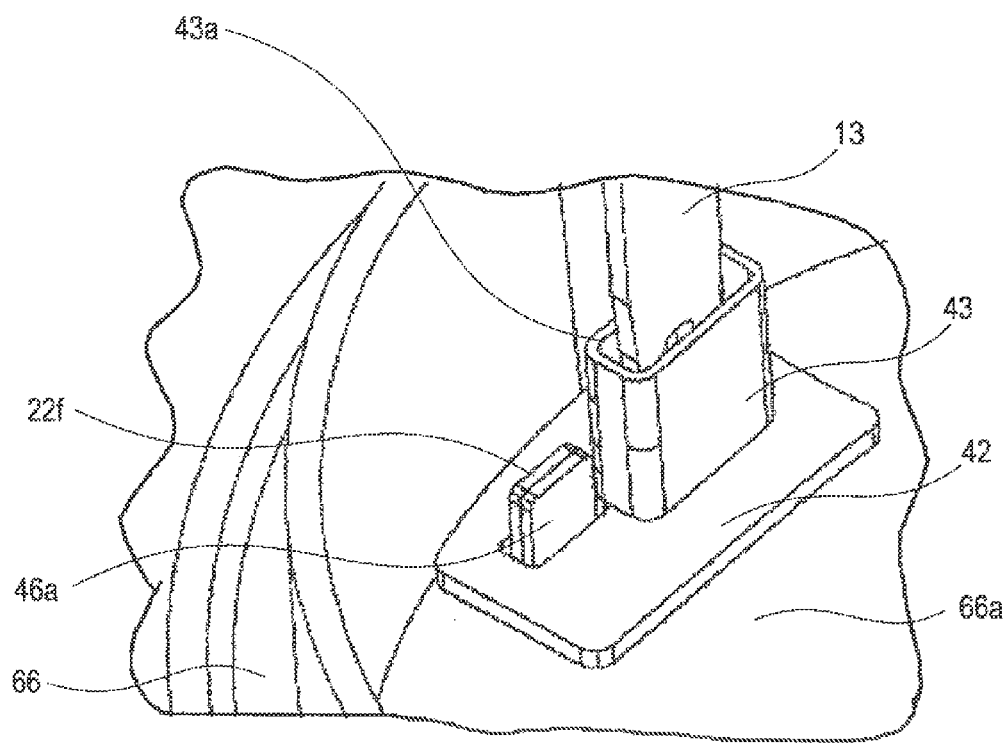
FIG. 13 is a perspective view of a major portion of an insulating member 42 when the motor terminal 13 is in proximity to a guide portion 43 before the motor terminal 13 is fixed in a state of being press-fit to a motor connection terminal 46.

A structure of an electric drive unit 300 of the third embodiment will be described using FIG. 10 through FIG. 13. FIG. 10 is a cross section of the electric drive unit 300 according to the third embodiment of the invention. FIG. 11 is a perspective view of a major portion of a housing 66 of FIG. 10. FIG. 11A is a perspective view of a major portion of a power module 64 in the vicinity of a module motor connection terminal 22f. FIG. 11B is a perspective view of the major portion after a motor connection terminal 46 is welded to the module motor connection terminal 22f of FIG. 11A. FIG. 12 is a perspective view of a major portion of the housing 66 before the electric motor 1 and the control apparatus 20 are connected in the electric drive unit 300 of FIG. 10. FIG. 13 is a perspective view of a major portion of an insulating member 42 when the motor terminal 13 is in proximity to a guide portion 43 before the motor terminal 13 is fixed in a state of press-fit to the motor connection terminal 46.

As are shown in FIG. 10 through FIG. 13, the position of the motor connection terminals 46 of the electric drive unit 300 of the third embodiment is different from the positions of the motor connection terminals (34 and 45) described in the first and second embodiments above. Also, because the position of the motor connection terminals 46 is changed, shapes of the housing 66, the power modules 64, and a frame 65 are also different from the shapes of the housing 36, the power modules (21 and 62), and the frames (30 and 63) described in the first and second embodiments above. The rest of the configuration is the same as those of the electric drive units (100 and 200) of the first and second embodiments above, and a detailed description is omitted herein.

As are shown in FIG. 10 and FIG. 11A, a plate 66a perpendicular to a direction of the rotation shaft 2 of the electric motor 1 is integrally molded with the housing 66. The plate 66a is provided with a through-hole 66b through which the rotation shaft 2 passes and through-holes 66c in which insulating members 42 is fixed described below in a press-fit state when the electric motor 1 and the control apparatus 20 are connected.

Also, of the lead frame 22 forming the power module 64, the module motor connection terminal 22f extends toward the side of the electric motor 1 of the housing 66 by passing through the through-hole 65a provided to the frame 65.

The insulating members 42 are, for example, a member made of insulating resin. As is shown in FIG. 12, the insulating member 42 is positioned on the side of the electric motor 1 of the housing 66 and, as has been described, fixed in a state of being press-fit to the through-hole 66c provided to the housing 66. The insulating member 42 is provided with a flange 42a serving as a stopper that suppresses movements of the insulating member 42 itself toward the control apparatus 20.

The insulating member 42 is provided with a guide portion 43 made of insulating resin and having an insertion hole 43a in which the motor terminal 13 is inserted so as to guide the motor terminal 13 to allow the slit 13a in the motor terminal 13 to sandwich the motor connection terminal 46. The insertion hole 43a is of a tapered shape by which an axial cross section of the guide portion 43 becomes gradually narrower with respect to the axial direction from the side of the electric motor 1 (inlet) toward the side of the control apparatus 20 (outlet). Hence, a position of the motor terminal 13 is corrected as the motor terminal 13 passes through the insertion hole 43a. The motor terminal 13 can be thus guided to the position at which the motor connection terminal 46 is present.

Also, the insulating member 42 is formed by insert-molding the motor connection terminals 46. The motor connection terminal 46 is formed on a plane perpendicular to the rotation shaft 2 and a connection portion 46a exposed from the insulating member 42 is formed by bending one end in the shape of a capital L. As is shown in FIG. 11B, the connection portion 46a and the module motor connection terminal 22f are connected by joining means, such as welding.

As has been described, the electric drive unit 300 according to the third embodiment of the invention further includes the housing 66 disposed on the axis line of the rotation shaft 2 and connecting the electric motor 1 and the control apparatus 20. The insulating members 42 are positioned and fixed to the housing 66 on the side of the electric motor 1 and the motor connection terminals (second terminal) 46 are fixed to the housing 66 via the insulating members 42. According to this configuration, the insulating members 42 are positioned between the electric motor 1 and the control apparatus 20, that is, on the side of the electric motor 1 of the housing 66 that is positioned on the side of the electric motor 1 of the control apparatus 20. The motor connection terminals 46 are fixed to the housing 66 via the insulating members 42.

In this manner, the housing 66 is positioned between the electric motor 1 and the control apparatus 20 and positioned on the side closer to the electric motor 1 than the frame 65 and the power module 64. Hence, the motor connection terminals 46 fixed to the housing 66 are also positioned on the side of the electric motor 1. Accordingly, the motor terminals (first terminal) 13 extending parallel to the axial direction of the rotation shaft 2 from the electric motor 1 toward the control apparatus 20 becomes shorter. Hence, the motor terminals 13 undergo deformation by buckling or the like less frequently. It thus becomes possible to provide an electric drive unit with enhanced reliability.

In particular, in a case where the motor terminals 13 are formed by press working a plate material of special copper alloy having higher heat-resistant creep characteristics than the motor connection terminals 46, an amount of used special copper alloy is reduced because the motor terminals 13 become shorter. The cost of the electric drive unit is thus reduced.

It is not limited to the motor terminals 13 of a column shape and, in general, when the column is too long, the column changes in a curved line (undergoes deflection) due to its own weight and position gap occurs at the both ends, so that the positional accuracy of the motor terminal 13 is deteriorated. Hence, in the first and second embodiments above, because the motor terminals 13 are relatively long, there is a risk that the position of the motor terminals 13 is displaced when the motor terminals 13 sandwich the motor connection terminals (34 or 45) and the positional accuracy of the motor terminals 13 is deteriorated. In the third embodiment, however, the motor terminals 13 become shorter and position gap of the motor terminal 13 hardly occurs. Should position gap occur, the positional accuracy of the motor terminals 13 is still enhanced in comparison with the positional accuracy of the motor terminals 13 of the first and second embodiments above. Ease of assembly and the reliability of the electric drive unit are thus enhanced.

When the motor terminals 13 become shorter, the module motor connection terminals 22f, which are the lead frames 22 forming the power modules 64, become longer and the occurrence of position gap is concerned. However, as is shown in FIG. 12, position gap is absorbed when the module motor connection terminals 22f are connected to the motor connection terminals 46 by joining means, such as welding. Hence, such position gap has no influence on the positional accuracy of the motor connection terminals 46 when the motor terminals 13 sandwich the motor connection terminals 46. Hence, the positional accuracy when the motor terminals 13 sandwich the motor connection terminals 46 is enhanced. Ease of assembly and the reliability of the electric drive unit are thus enhanced.

Also, when the insulating members 42 are fixed in a state of being press-fit to the through-holes 66c provided to the housing 66, the position of the motor connection terminals 46 fixed via the insulating members 42 is fixed as well. Hence, position gap of the motor connection terminals 46 becomes smaller, which allows the motor terminals 13 to sandwich the motor connection terminals 46 in a reliable manner. Ease of assembly of the electric drive unit is thus enhanced. Moreover, in the third embodiment of the invention, the insulating members 42 are provided with the flanges 42a serving as a stopper that suppresses movements of the insulating members 42 per se toward the control apparatus 20. Hence, it becomes possible to regulate the insulating members 42 fixed to the housing 66 not to move any further toward the control apparatus 20. Also, because the insulating members 42 are fixed in a reliable manner, position gap of the motor connection terminals 46 becomes smaller, too, which allows the motor terminals 13 to sandwich the motor connection terminals 46 in a reliable manner. Ease of assembly of the electric drive unit is thus enhanced further.

Also, the motor connection terminals 46 are fixed to the housing 66 via the insulating members 42 and the insulating members 42 are provided with the guide portions 43 in which the motor terminals 13 are inserted. Hence, when the motor terminals 13 sandwich the motor connection terminals 46, the guide portions 43 serve as a guide that corrects a position of the motor terminals 13 to be the position at which the motor connection terminals 46 are present. The motor terminals 13 are therefore guided by the guide portions 43 and allowed to sandwich the motor connection terminals 46. Ease of assembly of the electric drive unit is thus enhanced.

The third embodiment has described a case where the guide portions 43 are formed as components separate from the insulating members 42. It should be appreciated, however, that because both of the insulating members 42 and the guide portions 43 are molded from insulating resin, the both components can be integrally molded into a single piece. By integrally molding the insulating members 42 and the guide portions 43 from insulating resin, assembly man-hours are reduced. The cost of the electric drive unit can be thus reduced.

Moreover, the positional accuracy of the guide portions 43 is enhanced in comparison with a case where the both components are formed separately. Hence, not only is ease of assembly of the electric drive unit further enhanced, but the reliably of the electric drive unit is also enhanced. Further, in the third embodiment, the guide portions 43 are formed, as is shown in FIG. 13, so as to cover the periphery of the motor terminals 13. Hence, an insulating property can be ensured. The reliability of the electric drive unit is thus enhanced further.

Also, the motor connection terminals 46 are insert-molded in the insulating members 42 made of insulating resin. Hence, the both ends of the motor connection terminals 46 are fixed with the insulating resin when the insulating members 42 are formed. Hence, a load applied to the motor connection terminals 46 during the press-fitting when the motor terminals 13 are fixed in a state of being press-fit to the motor connection terminals 46 is applied uniformly without concentrating to any point. Also, a load received by the motor connection terminals 46 can be received by the entire insulating members 42. Hence, deformation and damage of the motor connection terminals 46 can be prevented. The reliability of the electric drive unit is thus enhanced.

Also, the position of the motor connection terminals 46 is fixed when the motor connection terminals 46 are insert-molded in the insulating members 42. Hence, position gap of the motor connection terminals 46 becomes smaller, which allows the motor terminals 13 to sandwich the motor connection terminals 46 in a reliable manner. Ease of assembly of the electric drive unit is thus enhanced. Moreover, because the assembly man-hours are reduced by insert-molding the motor connection terminals 46 in the insulating member 42, the cost can be reduced.

Fourth Embodiment

Figure 14:
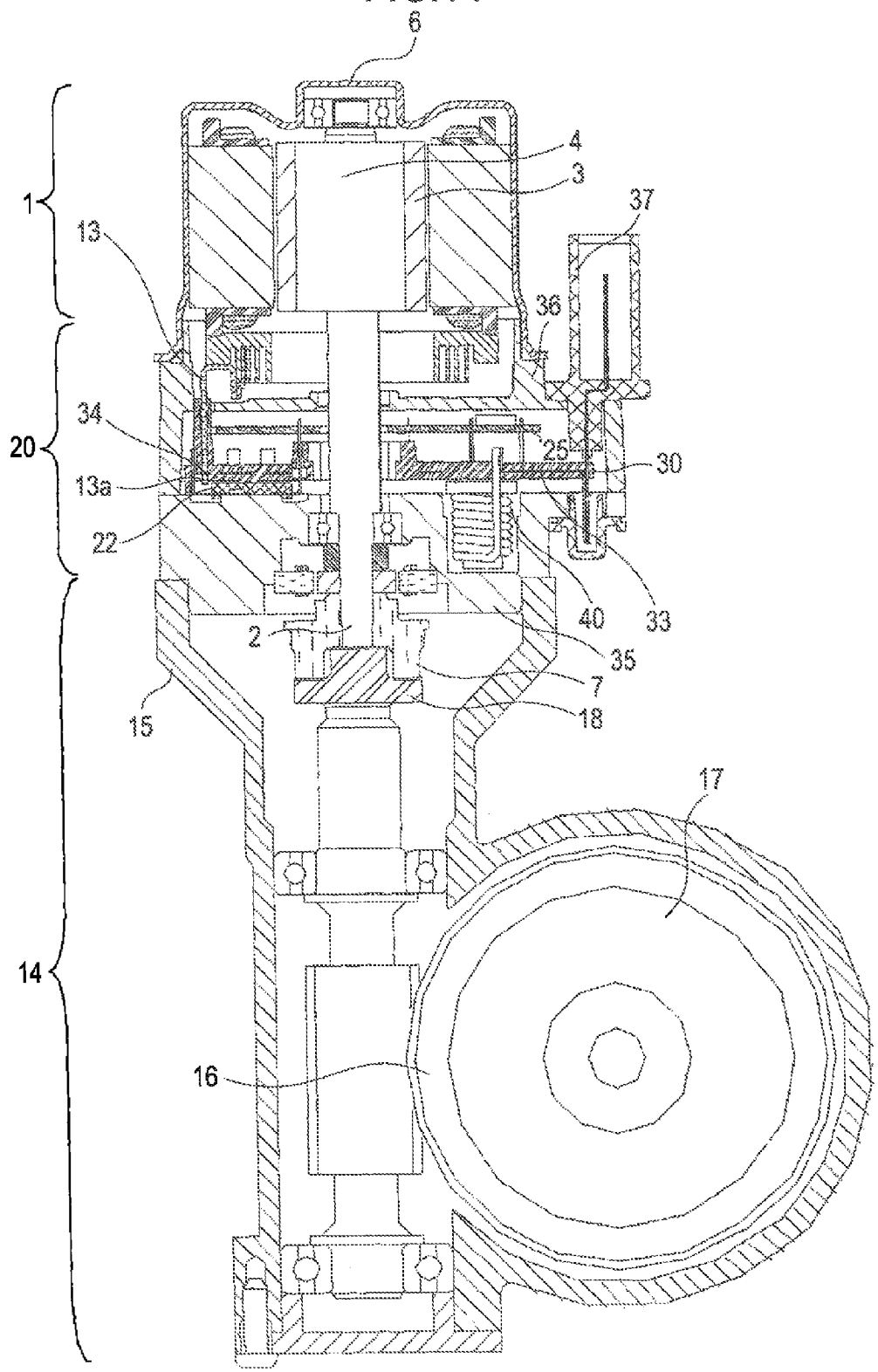
FIG. 14 is a cross section of an electric power steering apparatus according to a fourth embodiment of the invention.

The first through third embodiments above have described the electric drive units (100, 200, and 300, respectively) employed in an electric power steering apparatus. A fourth embodiment will describe, using FIG. 14 and FIG. 15, an electric power steering apparatus to which the electric drive unit 101 of the first embodiment above is attached as one of the electric power steering apparatuses to which the electric drive units (100, 200, and 300) of the first through third embodiments are attached. FIG. 14 is a cross section of the electric power steering apparatus according to the fourth embodiment of the invention.

As is shown in FIG. 14, the electric power steering apparatus according to the fourth embodiment of the invention includes a speed reducing device 14 that reduces a rotating speed of the electric motor 1 and is attached to the electric drive unit 101 of the first embodiment above on the side of the control apparatus 20. More specifically, the electric drive unit 101 is fixed to the speed reducing device 14 with screws (not shown) via the heat sink 35 of the control apparatus 20.

The speed reducing device 14 has a gear case 15 to which the heat sink 35 of the control apparatus 20 is attached, a worm gear 16, which is a reduction gear that reduces rotations of the rotation shaft 2 and provided inside the gear case 15, and a worm wheel 17 meshed with the worm gear 16. A coupling 18 is fixed to the worm gear 16 at an end on the side of the rotation shaft 2. When the coupling 18 and the coupling 7 are coupled, a torque is transmitted from the electric motor 1 to the worm gear 16.

As has been described, the electric power steering apparatus according to the fourth embodiment of the invention has the speed reducing device 14 that reduces a rotating speed of the electric motor 1 and is attached to the heat sink 35 in the control apparatus 20 of the electric drive unit 101. Hence, heat generated from heat-generating components (coil 40, capacitor 41, and power modules 21) forming the control apparatus 20 (drive portion 61) is first released to the heat sink 35 and then further to the speed reducing apparatus 14. Heat generated from the control apparatus 20 is therefore released from the speed reducing device 14. Hence, a heat-releasing property of the electric power steering apparatus is enhanced. Accordingly, because a temperature rise when heat is generated in the control apparatus 20 is suppressed, it becomes possible to provide an electric power steering apparatus with enhanced reliability.

Figure 15:
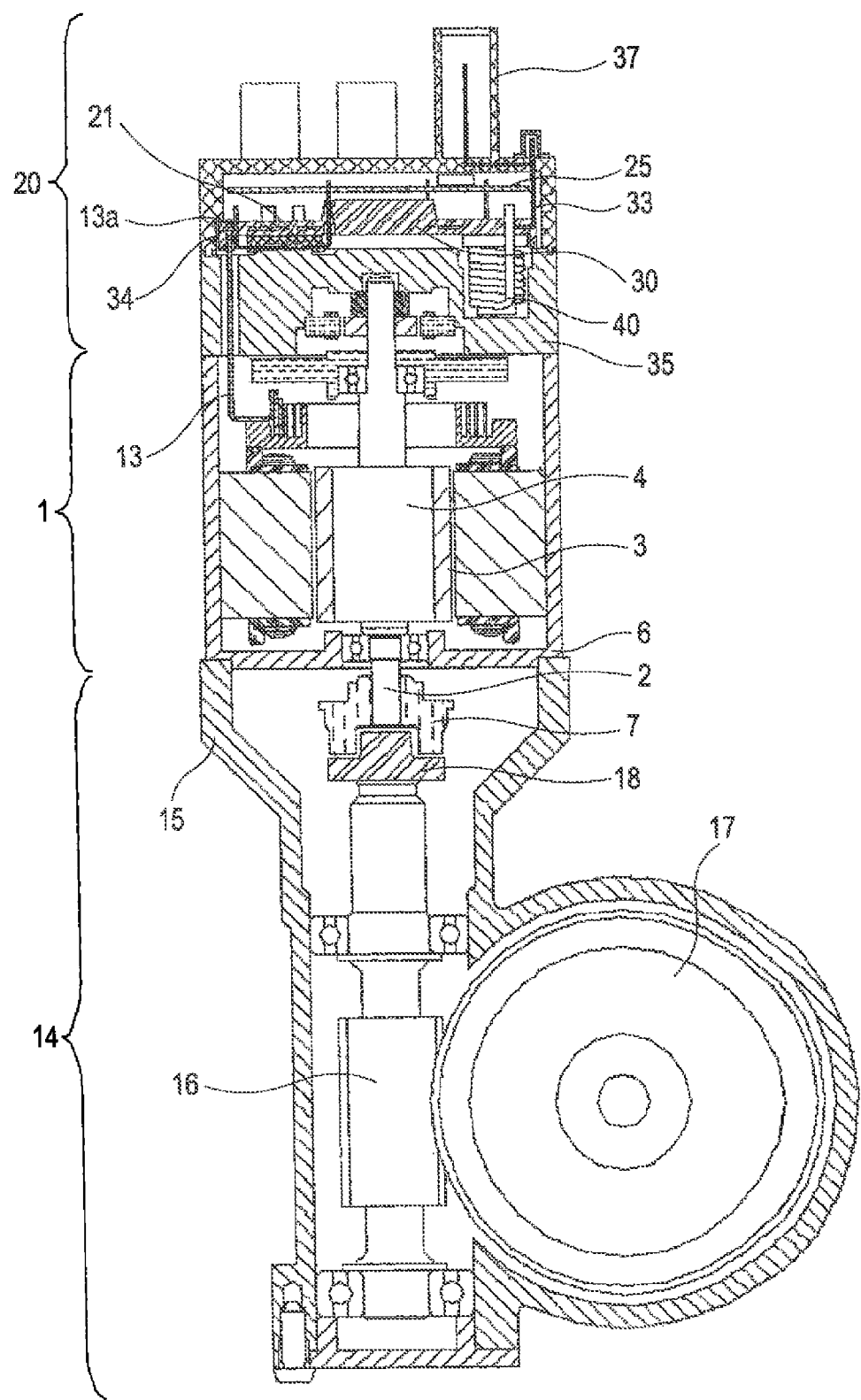
FIG. 15 is a cross section of another example of the electric power steering apparatus according to the fourth embodiment of the invention.

The fourth embodiment has described a case where the speed reducing device 14 is attached to the heat sink 35 located on the side of the control apparatus 20 of the electric dr unit 101 of the first, embodiment above. It should be appreciated however, that the speed reducing device 14 may be attached on the side of the electric motor 1, which is the opposite side to the control apparatus 20. FIG. 15 is a cross section of another example of the electric power steering apparatus according to the fourth embodiment of the invention. As is shown In FIG. 15, the electric power steering apparatus is formed by attaching the speed reducing device 14 to the electric drive unit 102 of the first embodiment above on the side of the electric motor specifically, the electric drive unit 102 is fixed to the speed reducing device 14 with screws (not shown) via the yoke 6 of the electric motor 1.

In the case shown in FIG. 15, the speed reducing device 14 that reduces a rotating speed of the electric motor 1 attached to the yoke 6 in the electric motor 1 of the electric drive unit 102. The electric motor 1 having a heavy weight is therefore sandwiched between the control apparatus 20 and the speed recuing device 14. Owing to this configuration, a durability performance against vibrations of the electric motor 1, that is, vibration resistance is increased. It thus becomes possible to provide an electric power steering apparatus with enhanced reliability.

In the respective embodiments above, the electric motor 1 is a brushless motor. It should be appreciated, however, that the invention is not limited to this case, and the electric motor 1 may instead be an induction motor or a switched reluctance motor (SR motor).

In the respective embodiments above, the FET 23*b* forming a motor relay serving as switching means for passing and interrupting a motor current IN to be supplied to the electric motor 1 is mounted on the power modules (21, 62, and 65). It should be appreciated, however, that a configuration that omits the FET 23*b* is also applicable. The shunt resistor 24 is integrally molded with the power modules (21, 62, and 65) as a forming component. It should be appreciated, however, that the shunt resistor 24 may be formed as a component separate from the power modules (21, 62, and 65). The respective embodiments above have described, as detection means of the motor current IM, a current detection circuit adopting a low-side method by which the shunt resistor 24 is interposed between the three-phase bridge circuit and the earth ground. It should be appreciated, however, that it is also possible to use, as another configuration, a current detection circuit adopting so-called a high-side method by which the shunt resistor is interposed between the high-potential side of the power supply that supplies the motor current IM to the electric motor 1 and the three-phase bridge circuit. Further, the detection means of the motor current IM may be formed of a component other than the shunt resistor 24.

REFERENCE SIGNS LIST

1: electric motor, 2: rotation shaft, 3: permanent magnet, 4: rotor, 5: stator, 6: yoke, 10: armature winding, 11: holder (abutment member), 11*a*: groove portion (supporting portion), 11*b*: abutment surface, 12, 12U, 12V, and 12W: terminal (intermediate member), 13, 13U, 13V, and 13W: motor terminal (first terminal) 13*a*: slit, 13*b*: arm portion, 13*c*1 and 13*c*2: taper, 13*d*: bending portion, 13*e*: end face, 30*a*: end face, 14: speed reducing device, 15: gear case, 16: worm gear, 17: worm wheel, 20: control apparatus, 21, 62, and 64: power module (semiconductor module) 22: lead frame, 22*a* and 22*b*: module power terminal, 22*c*, 22*e*, and 22*f*: module motor connection terminal, 22*d*: module signal terminal, 23: semiconductor switching element, 23*a*, 23*h*, and 23*c*: PET, 25: control board, 26: micro-computer, 27: drive circuit, 30, 63, and 65: frame, 31 and 43: guide portion 31*a*, 34*b*, and 43*a*: insertion hole, 33: conductive plate, 34, 34U, 34V, 34W, 45, and 46: motor connection terminal (second terminal), 33*a*, 34*a*, and 46*a*: connection portion, 35: heat sink (supporting member), 35*a*: concave portion, 35*b*: supporting portion, 36 and 66: housing, 36*a* and 66*a*: plate, 36*b*, 36*c*, 65*a*, 66*b*, and 66*c*: through-hole, 40: coil (passive element), 41: capacitor (passive element), 42: insulating member, 42*a*: flange, 50: battery, 60: relay module (semiconductor module), 61: drive portion, 62*a*: opening, 100, 101, 102, 200, and 300: electric drive unit

The invention claimed is:

1. An electric drive unit having an electric motor and a control apparatus that is disposed on an axis line of a rotation shaft of the electric motor and controls driving of the electric motor, wherein the control apparatus comprising:
   a drive portion that drives the electric motor and is formed of semiconductor switching elements switching a current of the electric motor and passive elements electrically connected to the switching elements, and
   a frame having a plurality of conductive plates configured to be connected to respective terminals of the passive elements, the conductive plates are insert-molded with insulating resin,
   wherein one of the electric motor and the control apparatus has a first terminal extending parallel to an axial direction of the rotation shaft toward the other with a slit being provided to the first terminal at an end on a side of the other;
   the other has a second terminal provided on a line extended from the first terminal and electrically connected to the first terminal; and
   the first terminal is fixed in a state of being press-fit to the second terminal by allowing the slit to sandwich the second terminal,
   wherein the first terminal is made of copper alloy having higher heat-resistant creep characteristics than the second terminal.

2. The electric drive unit according to claim 1, wherein at least tip ends of the slit in the first terminal are of a tapered shape.

3. The electric drive unit according to claim 1, wherein the first terminal has an end face perpendicular to the axis line of the rotation shaft at an end on a side opposite to a side where the slit is provided; and
an abutment member abutting the end face is further included.

4. The electric drive unit according to claim 1, wherein the first terminal is a motor terminal of the electric motor;
an intermediate member having lower heat-resistant creep characteristics than the motor terminal is further included; and
the motor terminal is electrically connected to an armature winding of the electric motor via the intermediate member.

5. The electric drive unit according to claim 4, wherein the electric motor further includes an insulating holder having a supporting portion that supports the intermediate member; and
the motor terminal is located on a radially outer side than the supporting portion.

6. The electric drive unit according to claim 1,
wherein the frame is provided with a guide portion in which the first terminal is inserted.

7. The electric drive unit according to claim 1,
wherein the first terminal is a motor terminal of the electric motor;
the second terminal is a motor connection terminal of the control apparatus; and
the motor connection terminal is insert-molded in the frame.

8. The electric drive unit according to claim 6,
wherein the frame has an end face perpendicular to the axis line of the rotation shaft on an outer side than the guide portion and at an end on an opposite side to the electric motor; and
a supporting member that supports the frame by abutting on the end face is further included.

9. The electric drive unit according to claim 1, wherein the first terminal is a motor terminal of the electric motor;
the second terminal is a motor connection terminal of the control apparatus;
a semiconductor module formed by encapsulating a semiconductor switching element in mold resin is further included;
the semiconductor module has an opening in which the motor terminal is inserted; and
the motor connection terminal is positioned and fixed on an inner side of the opening.

10. The electric drive unit according to claim 9,
wherein the motor connection terminal is integrally molded with the semiconductor module.

11. The electric drive unit according to claim 9,
wherein the control apparatus further includes a heat sink by which heat generated in the semiconductor module is released; and
the semiconductor module is fixed to the heat sink by fixing the frame to the heat sink in a state of being pressed against the heat sink.

12. An electric drive unit having an electric motor and a control apparatus that is disposed on an axis line of a rotation shaft of the electric motor and controls driving of the electric motor, wherein the control apparatus comprising:
a drive portion that drives the electric motor and is formed of semiconductor switching elements switching a current of the electric motor and passive elements electrically connected to the switching elements, and
a frame having a plurality of conductive plates configured to be connected to respective terminals of the passive elements, the conductive plates are insert-molded with insulating resin,
wherein one of the electric motor and the control apparatus has a first terminal extending parallel to an axial direction of the rotation shaft toward the other with a slit being provided to the first terminal at an end on a side of the other;
the other has a second terminal provided on a line extended from the first terminal and electrically connected to the first terminal; and
the first terminal is fixed in a state of being press-fit to the second terminal by allowing the slit to sandwich the second terminal, and wherein
the first terminal is a motor terminal of the electric motor;
the second terminal is a motor connection terminal of the control apparatus;
a housing disposed on the axial line of the rotation shaft and connecting the electric motor and the control apparatus is further included;
an insulating member is positioned and fixed to the housing on a side of the electric motor; and
the motor connection terminal is fixed to the housing via the insulating member.

13. The electric drive unit according to claim 12, wherein the insulating member is fixed in a state of being press-fit to a through-hole provided to the housing.

14. The electric drive unit according to claim 12,
wherein the insulating member is provided with a guide portion in which the motor terminal is inserted.

15. The electric drive unit according to claim 12,
wherein the motor connection terminal is insert-molded in the insulating member.

16. The electric drive unit according to claim 1,
wherein a speed reducing apparatus that reduces a rotation speed of the electric motor is attached to the electric motor on an opposite side to the control apparatus.

17. The electric drive unit according to claim 1,
wherein a speed reducing apparatus that reduces a rotation speed of the electric motor is attached to the control apparatus on an opposite side to the electric motor.

* * * * *